(12) United States Patent
Hayamizu et al.

(10) Patent No.: US 11,541,677 B2
(45) Date of Patent: Jan. 3, 2023

(54) INK SET AND METHOD FOR RECORDING PRINTED MATTER

(71) Applicants: TOYO INK SC HOLDINGS CO., LTD., Tokyo (JP); TOYOCOLOR CO. LTD., Tokyo (JP)

(72) Inventors: Mayuko Hayamizu, Tokyo (JP); Atsushi Yoda, Tokyo (JP); Kazuhiro Jonai, Tokyo (JP)

(73) Assignees: TOYO INK SC HOLDINGS CO., LTD., Tokyo (JP); TOYOCOLOR CO., LTD, Tokyo (JP)

( * ) Notice: Subject to any disclaimer, the term of this patent is extended or adjusted under 35 U.S.C. 154(b) by 0 days.

(21) Appl. No.: 16/960,196

(22) PCT Filed: Oct. 21, 2019

(86) PCT No.: PCT/JP2019/041369
§ 371 (c)(1),
(2) Date: Jul. 6, 2020

(87) PCT Pub. No.: WO2020/090554
PCT Pub. Date: May 7, 2020

(65) Prior Publication Data
US 2021/0060993 A1 Mar. 4, 2021

(30) Foreign Application Priority Data
Oct. 30, 2018 (JP) .............................. JP2018-204285

(51) Int. Cl.
*B41M 5/00* (2006.01)
*C08K 3/28* (2006.01)
(Continued)

(52) U.S. Cl.
CPC .............. *B41M 5/0017* (2013.01); *B41J 2/01* (2013.01); *B41J 2/2107* (2013.01); *B41J 2/2114* (2013.01);
(Continued)

(58) Field of Classification Search
CPC .... B41J 2/1433; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/033; C09D 11/037; C09D 11/107; B41M 5/0011; B41M 5/0017; B41M 5/0023; B41M 5/0047; B41M 7/00; B41M 7/0072; B41M 5/52; B41M 5/5218; B41M 5/5227; B41M 1/04; B41M 5/0064; B41M 7/0081; A61L 2/087; A61L 2202/18; A61L 2202/23
See application file for complete search history.

(56) References Cited

U.S. PATENT DOCUMENTS

| | | | | |
|---|---|---|---|---|
| 5,846,306 | A * | 12/1998 | Kubota | C09D 11/32 347/100 |
| 6,080,229 | A * | 6/2000 | Watanabe | B41M 5/5227 106/31.86 |
| 2004/0125185 | A1 | 7/2004 | Takada et al. | |
| 2008/0117273 | A1* | 5/2008 | Yamashita | B41J 11/002 347/96 |
| 2010/0053236 | A1 | 3/2010 | Ooishi et al. | |
| 2010/0062160 | A1 | 3/2010 | Yanagi et al. | |

(Continued)

FOREIGN PATENT DOCUMENTS

| | | |
|---|---|---|
| EP | 3 653 678 A1 | 5/2020 |
| EP | 3 653 679 A1 | 5/2020 |

(Continued)

OTHER PUBLICATIONS

International Search Report for PCT/JP2019/041369 dated Dec. 10, 2019 [PCT/ISA/210].
Extended European Search Report dated Jun. 23, 2022 in European Application No. 19880877.6.

*Primary Examiner* — Manish S Shah
(74) *Attorney, Agent, or Firm* — Sughrue Mion, PLLC

(57) ABSTRACT

An ink set including an inkjet ink, and a treatment liquid used in combination with the inkjet ink, wherein the inkjet ink includes a pigment, a water-soluble organic solvent, a surfactant and water, the treatment liquid includes a coagulant, an organic solvent and water, the coagulant includes calcium nitrate in an amount of 21.5 to 41.7% by mass relative to the total mass of the treatment liquid, an amount of organic solvent having a boiling point at one atmosphere of 240° C. or higher in the treatment liquid is not more than 8% by mass, a pH of the treatment liquid is within a range from 3.5 to 10.5, and a viscosity of the treatment liquid at 25° C. is within a range from 5.5 to 18.5 mPa·s.

10 Claims, 1 Drawing Sheet

(51) Int. Cl.

| | | |
|---|---|---|
| *C09D 11/033* | (2014.01) | |
| *C09D 11/107* | (2014.01) | |
| *C09D 11/322* | (2014.01) | |
| *C09D 11/38* | (2014.01) | |
| *C09D 11/54* | (2014.01) | |
| *B41J 2/01* | (2006.01) | |
| *B41J 2/21* | (2006.01) | |

(52) U.S. Cl.
CPC .............. *C08K 3/28* (2013.01); *C09D 11/033* (2013.01); *C09D 11/107* (2013.01); *C09D 11/322* (2013.01); *C09D 11/38* (2013.01); *C09D 11/54* (2013.01); *C08K 2003/287* (2013.01)

(56) References Cited

U.S. PATENT DOCUMENTS

| | | | |
|---|---|---|---|
| 2010/0231671 A1* | 9/2010 | Anton | C09D 11/40 347/101 |
| 2011/0063362 A1 | 3/2011 | Takaori et al. | |
| 2011/0211014 A1 | 9/2011 | Irita | |
| 2012/0251795 A1 | 10/2012 | Okada et al. | |
| 2013/0088543 A1* | 4/2013 | Tsuji | B41M 5/0017 347/21 |
| 2013/0187998 A1* | 7/2013 | Ohmoto | C09D 11/322 347/100 |
| 2013/0224447 A1* | 8/2013 | Ohashi | D06M 11/83 428/196 |
| 2013/0249996 A1 | 9/2013 | Saito et al. | |
| 2013/0321525 A1* | 12/2013 | Fujii | B41M 5/0011 347/21 |
| 2015/0044372 A1 | 2/2015 | Okada et al. | |
| 2015/0054883 A1* | 2/2015 | Okuda | C09D 11/322 347/20 |
| 2015/0174939 A1* | 6/2015 | Aoyama | B41M 5/0017 347/21 |
| 2015/0197654 A1* | 7/2015 | Okuda | B41M 5/0017 347/21 |
| 2015/0274992 A1* | 10/2015 | Aoyama | B41M 5/0017 347/21 |
| 2016/0303872 A1* | 10/2016 | Okuda | B41M 5/0017 |
| 2016/0312053 A1* | 10/2016 | Yano | C09D 11/322 |
| 2017/0361637 A1* | 12/2017 | Taniuchi | B41F 19/002 |
| 2018/0244943 A1* | 8/2018 | Okuda | C09D 11/322 |

FOREIGN PATENT DOCUMENTS

| | | |
|---|---|---|
| JP | 2004-106204 A | 4/2004 |
| JP | 2010-065170 A | 3/2010 |
| JP | 2010-076430 A | 4/2010 |
| JP | 2010-099968 A | 5/2010 |
| JP | 4585859 B2 | 9/2010 |
| JP | 2011-056884 A | 3/2011 |
| JP | 2011-178033 A | 9/2011 |
| JP | 2012-207338 A | 10/2012 |
| JP | 2018-114751 A | 7/2018 |

* cited by examiner

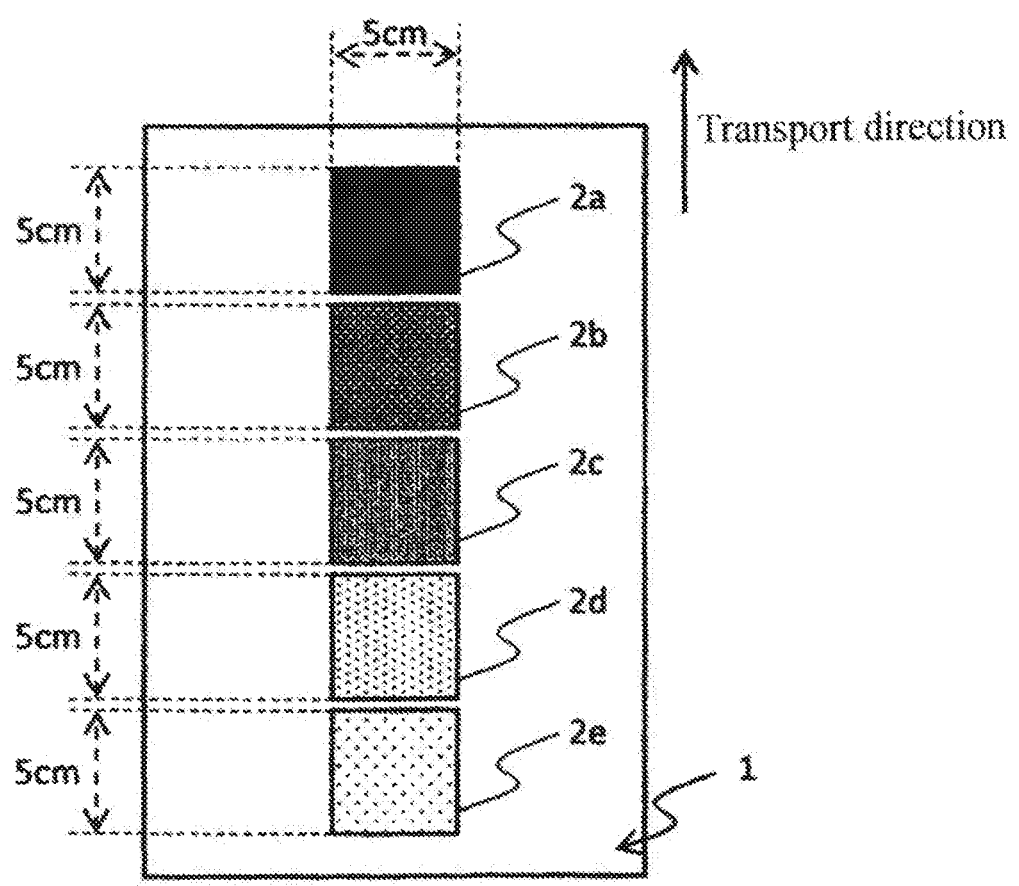

INK SET AND METHOD FOR RECORDING PRINTED MATTER

CROSS REFERENCE TO RELATED APPLICATIONS

This application is a National Stage of International Application No. PCT/JP2019/041369 filed Oct. 21, 2019, claiming priority based on Japanese Patent Application No. 2018-204285 filed Oct. 30, 2018.

TECHNICAL FIELD

Embodiments of the present invention relate to an ink set and a method for producing printed matter using the ink set.

BACKGROUND ART

Inkjet printing is a recording method in which liquid droplets of an inkjet ink that have been jetted from an inkjet head are jetted directly onto a recording medium to form text or images. Unlike conventional plate-based printing techniques such as offset printing and gravure printing, inkjet printing has characteristics that include not requiring plate-making and being compatible with variable printing, simple operation and adjustment of the printing apparatus, and little noise during printing. As a result, inkjet printing is not only used in offices and households, but has recently also been showing increased demand in industrial applications.

The inkjet inks used in inkjet printing are classified into solvent inks, aqueous inks and UV-curable inks and the like depending on the ink composition. On the other hand, in recent years, there has been a growing movement to restrict the use of organic solvents and photosensitive monomers that can be harmful to people and the environment. As a result, there is a growing demand for the replacement of solvent inks and UV-curable inks that use these types of restricted materials with aqueous inks.

Aqueous inkjet inks contain water as the main component, and in order to control the wetting of the recording medium and the drying properties, typically also contain an added water-soluble organic solvent such as glycerol or a glycol. When an inkjet ink containing these liquid components is used for printing (applying the ink to form) a pattern of text and/or images on a recording medium, the ink dries as a result of the liquid components penetrating into the recording medium and/or evaporating from the recording medium, thereby fixing the ink (solid components) to the recording medium.

On the other hand, recording media used in inkjet printing, broadly classified in terms of material, include paper substrates, fabric substrates, and plastic substrates and the like. Among these, the amount of paper substrates produced is large, and in the case of paper substrates, high-speed printing is required and high-image quality is also necessary. A large variety of paper substrates exist, from papers having high permeability such as high-quality papers and recycled papers, through to papers having low permeability (or no permeability) such as coated papers and art papers. In order to further expand the demand for inkjet printing, the development of aqueous inkjet inks that can be used on all manner of recording media is a considerable task for those skilled in the art.

However, with conventional aqueous inkjet inks, obtaining high image quality printed matter is difficult regardless of the recording medium. For example, when printing to a recording medium of high permeability, there is a possibility that the inkjet inks that have penetrated into the interior of the recording medium may mix together causing color mixing or a reduction in density. Moreover, even within a single recording medium, the surface state and state of penetration tends to vary, causing distortions in the image quality and leading to printed matter that lacks uniformity. In contrast, when printing to a recording medium of low permeability, the liquid droplets (dots) of the inkjet inks tends to mix, causing problems such as coalescence and color mixing. Moreover, because each of the liquid droplets tend to distort from a true circular shape, indistinct printed matter tends to be obtained.

One known countermeasure for the above problems is a method in which a treatment liquid is applied to the recording medium. Generally known treatment liquids for inkjet inks are of two types: treatment liquids that form a layer (an ink-receiving layer) that absorbs liquid components in the inkjet ink and improves the drying properties, and treatment that form a layer (an ink aggregation layer) that intentionally causes aggregation of solid components contained in the inkjet ink such as the colorant and resins, thereby preventing bleeding between liquid droplets and improving the image quality.

However, in the case of an ink-receiving layer, because the thickness of the layer must be considerably large, the texture of the recording medium tends to deteriorate. Further, other problems that may occur include reductions in the density and color gamut due to absorption of the ink by the ink-receiving layer, deterioration in the image uniformity caused by variations in the amount of absorption, and worsening of the image clarity due to a deterioration in the degree of circularity of the liquid droplets.

On the other hand, in the case of an ink aggregation layer, although the ability of the recording medium to receive the liquid components is inferior, the inkjet ink can be fixed on the surface of the ink aggregation layer without any significant impairment of the texture of the recording medium, and therefore printing at high density with a broad range of color rendering and good clarity is possible. Furthermore, by forming the ink aggregation layer uniformly, coalescence of the liquid droplets of the inkjet ink can be suppressed, and uniform printed matter can be obtained having dots with an ideal circular form across the entire surface of the recording medium.

However, when actual attempts are made to achieve improvements by applying the type of treatment liquids described above, other problems can sometimes arise. For example, Patent Document 1 discloses a treatment liquid (reaction liquid) that includes a coagulant containing a polyvalent metal ion or salt thereof, and a nonionic water-soluble polymer compound. Further, in the examples, treatment liquids are produced which contain a maximum of 10% by mass of calcium nitrate or yttrium nitrate as a coagulant, and also contain a polyvinyl alcohol, trimethylolpropane and an acetylene glycol ethylene oxide adduct, and these treatment liquids are applied to paper substrates having high water absorbency such as copy paper and bond paper.

However, investigations by the inventors of the present invention revealed that when the treatment liquid described above was printed onto the above recording media at high speed, satisfactory suppression of color mixing and the formation of dots having good circularity (hereafter referred to as "dot circularity") could not be achieved, and inadequate coverage tended to occur. A more detailed description is provided below, but it is thought that these observations are because the treatment liquid described above has a low concentration of the coagulant, meaning a satisfactory coagulant effect cannot be realized during high-speed printing. On the other hand, even if the amount of the coagulant described in Patent Document 1 is increased to a maximum (20% by mass of the treatment liquid), the amount is inadequate to achieve satisfactory color mixing suppression and dot circularity. Further, increasing the amount applied of the treatment liquid is also a possibility, but in such cases, because the amount of the coagulant contained in the ink aggregation layer prior to drying on the recording medium is small, there is a possibility of another problem occurring due to coalescence of the liquid droplets, leading to a deterioration in the printed image quality. This problem tends to be particularly marked when, following application of the treatment liquid, the inkjet ink is then printed without adequate drying of the treatment liquid.

Furthermore, Patent Document 2 discloses an image formation method that includes a step of applying a treatment liquid which contains a coagulant and has a prescribed viscosity and surface tension. The examples describe treatment liquids containing a maximum of 25% by mass of the coagulant, and also containing diethylene glycol monobutyl ether or the like. However, the viscosity of the treatment liquid of Patent Document 2 is prescribed as an extremely low value of 2 to 5 mPa·s. Accordingly, depending on the recording medium used, coating irregularities may occur during high-speed printing, and there is also a possibility that during subsequent printing of the inkjet ink, irregularities in the dot shape and variations in the uniformity of the image may occur, resulting in printed matter of low image quality, Patent Document 3 discloses a treatment liquid containing prescribed amounts of glycerol and a coagulant selected from the group consisting of calcium nitrate and magnesium nitrate. Further, an example in Patent Document 4 discloses a treatment liquid containing 34% by mass of calcium nitrate tetrahydrate, 10% by mass of diethylene glycol and 5% by mass of methanol. However, although details are not described until the examples below, investigations by the inventors of the present invention confirmed that these treatment liquids exhibited unsatisfactory image quality and drying properties during high-speed printing. Further, it was also discovered that when these treatment liquids were stored for long periods, the dot circularity tended to deteriorate compared with freshly produced treatment liquids.

As outlined above, conventionally, no ink sets containing a treatment liquid and an inkjet ink exist which, regardless of printing conditions such as printing speed, and on all manner of recording media, are able to produce high-quality printed matter with excellent dot circularity, image uniformity and image density, and free of image defects such as color mixing and inadequate coverage, and also exhibit superior coating film durability and drying properties.

PRIOR ART DOCUMENTS

Patent Documents

Patent Document 1: JP 4585859 B
Patent Document 2: JP 2011-178033 A
Patent Document 3: JP 2011-56884 A
Patent Document 4: JP 2010-65170 A

SUMMARY OF INVENTION

Problems Invention Aims to Solve

One embodiment of the present invention have been developed in light of the above circumstances, and provides an ink set containing a treatment liquid and an inkjet ink which, regardless of the printing conditions such as the printing speed, and on all manner of recording media, particularly recording media having specific water absorption properties, is capable of producing high-quality printed matter with excellent dot circularity, image uniformity and image density, and free of image defects such as color mixing and inadequate coverage, and also exhibits superior drying properties. Further, another embodiment of the present invention provides the ink set described above which, in addition to the properties described above, can maintain the quality described above even after storage for long periods, and also exhibits excellent coating film durability. Yet another embodiment of the present invention provides a method for producing printed matter using the above ink set, the method being effective in obtaining desired quality characteristics for the printed matter.

Means for Solution of the Problems

As a result of intensive research aimed at resolving the issues described above, the inventors of the present invention discovered an ink set composed of a combination of an inkjet ink, and a treatment liquid which used a specific amount of calcium nitrate as a coagulant, and for which the amount of a high-boiling point solvent and the viscosity and pH of the treatment liquid each satisfied a prescribed range, thus enabling them to complete the present invention.

In other words, embodiments of the present invention include the embodiments described below. However, the present invention is not limited to the following embodiments, and includes a variety of embodiments.

In an embodiment, an ink set comprises an inkjet ink, and a treatment liquid used in combination with the inkjet ink, wherein the inkjet ink comprises a pigment, a water-soluble organic solvent, a surfactant and water, the treatment liquid comprises a coagulant, an organic solvent and water, the coagulant comprises calcium nitrate in an amount of 21.5 to 41.7% by mass relative to the total mass of the treatment liquid, an amount of organic solvent having a boiling point at one atmosphere of 240° C. or higher in the treatment liquid is not more than 8% by mass, a pH of the treatment liquid is within a range from 3.5 to 10.5, and a viscosity of the treatment liquid at 25° C. is within a range from 5.5 to 18.5 mPa·s.

In a preferable embodiment, the ink set is used for recording to a recording medium that exhibits an amount of absorption of pure water in a contact time of 100 msec, measured using a dynamic scanning absorption meter, of 5 to 15 g/m$^2$.

In a preferable embodiment, the treatment liquid also comprises a basic pH adjuster.

In a preferable embodiment, the inkjet ink also comprises a resin, and an amount of the resin, relative to a solid fraction of the inkjet ink, is within a range from 30% by mass to 90% by mass.

In a preferable embodiment, an acid value of the resin is within a range from 10 to 65 mgKOH/g.

In a preferable embodiment, the inkjet ink also comprises a wax.

In a preferable embodiment, an amount of organic solvent having a boiling point at one atmosphere of 240° C. or higher in the inkjet ink is not more than 8% by mass.

In another embodiment, it relates to a method for producing printed matter using the ink set according to any one of the above-mentioned embodiments, the method comprising:

applying the treatment liquid to a recording medium, and applying the inkjet ink in a state where a drying rate of the treatment liquid on the recording medium is not more than 10% in terms of mass.

In another embodiment, it relates to a printed matter obtained by printing the ink set according to any one of the above-mentioned embodiments onto a recording medium.

The present invention is related to the subject matter disclosed in prior Japanese Application 2018-204285 filed on Oct. 30, 2018, the entire contents of which are incorporated by reference herein.

Effects of the Invention

Embodiments of the present invention are able to provide an ink set containing a treatment liquid and an inkjet ink which, regardless of the printing conditions such as the printing speed, and on all manner of recording media, particularly recording media having specific water absorption properties, is capable of producing high-quality printed matter with excellent dot circularity, image uniformity and image density, and free of image defects such as color mixing and inadequate coverage, and also exhibits superior drying properties. Further, the present invention cam also provide the ink set described above which, in addition to the printed matter quality characteristics described above, can maintain the quality characteristics described above even after storage for long periods, and also exhibits excellent coating film durability. Moreover, the present invention can also provide a method for producing printed matter using the above ink set, the method being effective in obtaining the above desired quality characteristics for the printed matter.

DETAILED DESCRIPTION OF THE DRAWING

FIG. 1 is a plan view illustrating gradation printed matter used in evaluating the dot circularity and the image uniformity.

EMBODIMENTS FOR CARRYING OUT THE INVENTION

Preferred embodiments of the present invention are described below in further detail. However, the embodiments described below merely describe examples of the present invention. The present invention is in no way, limited by the following embodiments, and also includes all manner of modifications that can be made within the scope of the invention.

<1> Ink Set

An ink set of one embodiment of the present invention contains an inkjet ink (hereafter also referred to as simply "the ink") containing a pigment, a water-soluble organic solvent, a surfactant and water, and a treatment liquid containing a coagulant. The coagulant contains calcium nitrate in an amount of 21.5 to 41.7% relative to the total mass of the treatment liquid, and the amount of organic solvent having a boiling point at one atmosphere of 240° C. or higher in the treatment liquid is not more than 8% by mass (and may be 0% by mass). Further, the pH of the treatment liquid is within a range from 3.5 to 10.5, and the viscosity at 25° C. is within a range from 5.5 to 18.5 mPa·s. As described above in relation to the prior art, combinations of a treatment liquid and an inkjet ink are already being used in inkjet printing. However, this embodiment of the present invention employs a combination of an inkjet ink with a treatment liquid that contains prescribed amounts of specific materials and has a specific pH and viscosity. The treatment liquid and the inkjet ink are described below in further detail.

<1-1> Treatment Liquid

In the ink set of the embodiment described above, the treatment liquid is applied to a recording medium prior to printing of the inkjet ink, and is used for forming an ink aggregation layer on the recording medium. The calcium nitrate contained in the ink aggregation layer formed using the treatment liquid (hereafter also referred to as simply "the treatment liquid layer") dissociates within the treatment liquid layer to form nitrate ions and calcium ions. Further, when the treatment liquid layer is in a completely dried state and an inkjet ink containing an aqueous medium is subsequently applied, the calcium nitrate rapidly dissociates into nitrate ions and calcium ions. Accordingly, in the above embodiment, it is thought that when liquid droplets of the inkjet ink containing an aqueous medium such as water and a water-soluble organic solvent contact the treatment liquid layer, nitrate ions and calcium ions dissociate and are eluted into the liquid droplets of the inkjet ink, regardless of the state of dryness of the treatment liquid layer. These calcium ions diffuse through the ink droplets, and undergo cation-anion interactions with the solid components such as the pigment and resins that exist in a dissolved and/or dispersed state and have an anionic charge, thus causing changes in the state of adsorption. As a result, it is thought that aggregation and precipitation of the solid components and a localized increase in viscosity occur due to a deterioration in the above dissolved and/or dispersed state.

In this description, an "aqueous medium" means a medium formed from a liquid that contains at least water.

Examples of other known coagulants besides calcium nitrate that generate the type of aggregation mechanism described above include cationic resins, acidic compounds and inorganic metal salts other than calcium nitrate. The reasons for selecting calcium nitrate in this embodiment of the present invention include the characteristic features of the small-sized calcium ions, namely fast diffusion and permeation speeds and a superior aggregation action, and the superior solubility and wetting properties that are characteristic of a nitrate salts.

In other words, by using a treatment liquid containing a high concentration of calcium nitrate, the aggregation action of the calcium ions can be satisfactorily utilized. As a result, even during high-speed printing, dots of the inkjet ink (hereafter sometimes abbreviated a simply "the ink") can be aggregated immediately upon impact, enabling printed matter having superior dot circularity and image density to be produced. Further, satisfactory wetting properties for the ink on the treatment liquid layer can also be ensured, meaning printed matter of good coverage, with no banding or irregularities, can be produced.

Furthermore, compared with other inorganic metal salts, calcium nitrate absorbs a larger amount of heat upon dissociation. Accordingly, when used in combination with a recording medium which exhibits an amount of absorption of pure water, measured using a dynamic scanning absorption meter, of 5 to 15 $g/m^2$ during a 100 msec contact time, the heat absorption reaction causes a reduction in the liquid temperature of the surrounding ink droplet, resulting in an increase in the viscosity and the surface tension. As a result, feathering, excessive permeation and bleeding can be suppressed. Moreover, the surfactant contained in the ink orients rapidly at the ink liquid droplet interface, enabling suppression of coalescence of the ink liquid droplets.

As a result of investigations by the inventors of the present invention, it was discovered that when the amount of calcium nitrate present in the treatment liquid was set to a value within a range from 21.5 to 41.7% by mass relative to the total mass of the treatment liquid, high image quality printed matter combining a favorable aggregation action and favorable coverage could be obtained in a stable manner, regardless of the ink composition, the type of recording medium being used, or the printing speed.

Further, in one embodiment, the amount of organic solvent having a boiling point at one atmosphere of 240° C. or higher in the treatment liquid is not more than 8% by mass, and may be 0% by mass A treatment liquid in which the amount of organic solvent having a boiling point of 240° C. or higher is not more than 8% by mass dries extremely quickly when an ink is applied following application of the treatment liquid. By using a treatment liquid of this embodiment, printing at 50 m/min, or even 100 m/min, can be achieved with relative ease.

Furthermore, as a result of investigations by the inventors of the present invention, it was discovered that organic solvents having a boiling point of 240° C. or higher generally have a high surface tension, and tend to affect the wet spreadability of the subsequently applied inkjet ink anal the coverage of the printed matter. Accordingly, it can be stated that restricting the amount of the aforementioned high-boiling point organic solvents to not more than the prescribed amount is also important from the viewpoint of improving the coverage of the printed matter.

Moreover, in one embodiment, the pH of the treatment liquid may be within a range from 3.5 to 10.5. Under strongly acidic or strongly basic conditions, ionic components such as hydrogen ions and hydroxide ions tend to exist in excessive amounts. In investigations conducted by the inventors of the present invention, it was found that those ionic components inhibit the flow of calcium ions, causing a deterioration in color mixing and dot circularity.

In addition, in one embodiment, the treatment liquid preferably has a viscosity at 25° C. within a range from 5.5 to 18.5 mPa·s. The viscosity of the treatment liquid affects the level of irregularities during coating and the image uniformity of the printed matter, particularly during high-speed printing. For example, in the case of a treatment liquid of low viscosity, the wettability of the recording medium is favorable. However, depending on the recording medium being used, coating irregularities may occur during high-speed printing, and when an inkjet ink is subsequently printed, irregularities in the dot shape, and a lack of uniformity in image quality may occur. On the other hand, in the case of a high-viscosity treatment liquid, the wettability of the recording medium and the wet spreadability following application to the recording medium tend to deteriorate. Accordingly, in the case of a high-viscosity treatment liquid also, there is a possibility of irregularities in the dot shape and a lack of uniformity in image quality.

In one embodiment, the inkjet ink used in combination with the treatment liquid described above contains a surfactant in addition to the pigment and the water-soluble organic solvent.

Investigations by the inventors of the present invention revealed that when an ink having the above composition was combined with the treatment liquid of an embodiment described above, the dot circularity and coverage were particularly superior. In other words, by using a combination of the treatment liquid and the inkjet ink described above, printed matter having favorable image quality can be produced not only on low-absorption substrates, but also on high-absorption substrates such as high-quality papers and liner papers which, because they exhibit ready permeability, tend to suffer from poor dot circularity and inadequate coverage.

As described above, it is thought that by using the combination of the treatment liquid and the ink of an embodiment described above, high image quality printed matter with excellent dot circularity, image uniformity and image density, and free of image defects such as color mixing and inadequate coverage can be produced on all manner of recording media, regardless of printing conditions such as the printing speed. It should be noted that the mechanisms described above are merely conjecture, and in no way limit the present invention.

Next, the constituent elements of the treatment liquid of the embodiments described above are described in further detail.

<Calcium Nitrate>

The treatment liquid contains calcium nitrate. By using calcium nitrate, dissolution and/or dispersion of the solid components that exist in the inkjet ink is reduced, and by causing aggregation and precipitation of the solid components, together with localized thickening, color mixing caused by ink droplet coalescence can be ameliorated, and images (printed matter) of high image quality can be obtained regardless of the printing conditions. Further, as described above, the calcium ions generated upon dissociation of the calcium nitrate have a small ion size, and therefore move and diffuse readily within the ink droplets and through the interior of the recording medium. Furthermore, the valence of the ions is divalent, meaning compared with monovalent cations, the aggregation action and insolubilization capability are superior. Accordingly, calcium ions that have penetrated into the ink droplets immediately move to all regions within the ink droplets, and can reduce the dissolution and/or dispersion action of the solid components having an anionic charge such as the pigment and resins. As a result, even with high-speed printing, high-image quality printed matter can be obtained with no color mixing or deterioration in the degree of circularity. Moreover, by utilizing the high solubility in water that is a characteristic of calcium nitrate, a large amount of calcium ions can be generated in the treatment liquid. In other words, even with a small coating amount, the effects of the calcium ions are able to manifest. As a result, even during high-speed printing, the combination with the ink described above enables aggregation to occur with good maintenance of the dot circularity immediately upon the dots impacting the recording medium, and in addition, printed matter that also exhibits excellent drying properties can be obtained.

Further, as mentioned above, from the viewpoint of enhancing the synergistic effects with the inkjet ink, and obtaining high-quality printed matter that combines a favorable aggregation action with favorable coverage, the blend amount of the calcium nitrate in the treatment liquid of an embodiment described above is preferably within a range from 21.5 to 41.7% by mass relative to the total mass of the treatment liquid. Further, from the viewpoint of the coating film durability and the drying properties, the above blend amount is preferably within a range from 21.5 to 40% by mass, and particularly preferably from 21.5 to 35% by mass. The blend amount of the calcium nitrate mentioned above represents the blend amount as anhydrous calcium nitrate.

<Organic Solvent>

In one embodiment, the treatment liquid preferably also contains an organic solvent. By also including an organic solvent, the moisture retention, drying properties and wetting properties of the treatment liquid can be further improved. Although there are no particular limitations on the organic solvents that may be used in the treatment liquid, inclusion of a water-soluble organic solvent is preferred. These organic solvents are deemed to not include pH adjusters.

In one embodiment, in the case where an organic solvent is used, the amount of organic solvent having a boiling point of 240° C. or higher is preferably not more than 8% by mass relative to the total mass of the treatment liquid, and may be 0% by mass. In one embodiment, the amount of organic solvent having a boiling point of 240° C. or higher is more preferably not more than 4% by mass, relative to the total mass of the treatment liquid, and is even more preferably 0% by mass. By either including no organic solvent having a boiling point of 240° C. or higher, or if included, ensuring that the amount falls within the above range, satisfactory drying properties for the treatment liquid and the inkjet ink can be achieved during high-speed printing. Further, because penetration into and retention within the interior of the recording medium can be suppressed, the aggregation action of the calcium nitrate and the coating film durability can also be improved. Moreover, as mentioned above, restricting the amount of organic solvent having a boiling point of 240° C. or higher is also preferred from the viewpoint of improving the coverage of the printed matter. In this description, the term "0% by mass" means the subject material is not included.

In one embodiment, from the viewpoints of the affinity with water and the calcium nitrate, and the solubility of the calcium nitrate, the organic solvent included in the treatment liquid preferably employs at least a water-soluble organic solvent containing one or two hydroxyl groups in the molecular structure.

Specific examples of water-soluble organic solvents containing one or two hydroxyl groups in the molecular structure that can be used favorably in the treatment liquid include the following:

monohydric alcohols such as methanol, ethanol, 1-propanol, 2-propanol, 1-butanol, 2-butanol, 3-methoxy-1-butanol, and 3-methoxy-3-methyl-1-butanol;

dihydric alcohols (glycols) such as 1,2-ethanediol, 1,2-propanediol, 1,3-propanediol, 1,2-butanediol, 1,3-butanediol, 1,4-butanediol, 1,2-pentanediol, 1,5-pentanediol, 1,2-hexanediol, 1,6-hexanediol, 1,2-heptanediol, 2,2-dimethyl-1,3-propanediol, 2-methyl-1,3-propanediol, 2-ethyl-2-methyl-1,3-propanediol, 3-methyl-1,3-butanediol, 3-methyl-1,5-pentanediol, 2-methyl--2-propyl-1,3-propanediol, 2-methylpentan-2,4-diol, 2-ethyl-1,3-hexanediol, 1,2-octanediol, diethylene glycol, triethylene glycol, dipropylene glycol, butylene glycol, and dibutylene glycol; and glycol monoalkyl ethers such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol monobutyl ether, dipropylene glycol monopropyl ether, tripropylene glycol monomethyl ether, and tripropylene glycol monoethyl ether.

In one embodiment, among the compounds listed above, the use of a monohydric alcohol such as ethanol, 1-propanol, 2-propanol, 3-methoxy-1-butanol or 3-methoxy-3-methyl-1-butanol is particularly preferred. Further, one of the aforementioned water-soluble organic solvents having one or two hydroxyl groups in the molecular structure may be used alone, or a combination of two or more such organic solvents may be used.

In one embodiment, the blend amount of the water-soluble organic solvent having one or two hydroxyl groups in the molecular structure contained in the treatment liquid, relative to the total mass of the treatment liquid, is preferably within a range from 0.1 to 30% by mass, more preferably from 1 to 25% by mass, and particularly preferably from 1 to 20% by mass. In one embodiment, the water-soluble organic solvent contains from 1 to 10% by mass of monovalent and/or divalent alcohols, and preferably monovalent alcohols, relative to the total mass of the treatment liquid. By adjusting the blend amount of the water-soluble organic solvent so as to fall within the above range, a treatment liquid can be obtained that yields excellent moisture retention and coating film durability, as well as a combination of superior drying properties and wetting properties. Further, regardless of the printing method used for the treatment liquid, stable printing can be achieved over long periods.

In addition to the water-soluble organic solvent described above, the treatment liquid may also include other organic solvents such as:

glycol dialkyl ethers such as diethylene glycol dimethyl ether, diethylene glycol methyl ethyl ether, diethylene glycol butyl methyl ether, diethylene glycol diethyl ether, triethylene glycol dimethyl ether, triethylene glycol methyl ethyl ether, triethylene glycol butyl methyl ether, triethylene glycol diethyl ether, tetraethylene glycol dimethyl ether, tetraethylene glycol methyl ethyl ether, tetraethylene glycol butyl methyl ether, and tetraethylene glycol diethyl ether;

nitrogen-containing solvents such as 2-pyrrolidone, N-methylpyrrolidone, N-ethylpyrrolidone, ε-caprolactam, 3-methyl-2-oxazolidinone, 3-ethyl-2-oxazolidinone, N,N-dimethyl-β-methoxypropionamide, N,N-dimethyl-β-ethoxypropionamide, N,N-dimethyl-β-butoxypropionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β-octoxypropionamide, N,N-diethyl-β-butoxypropionamide, N,N-diethyl-β-pentoxypropionamide, N,N-diethyl-β-hexoxypropionamide, N,N-diethyl-β-heptoxypropionamide, and N,N-diethyl-β-octoxypropionamide; and heterocyclic compounds such as γ-butyrolactone, γ-valerolactone, δ-valerolactone, and ε-caprolactone.

One of these other organic solvents listed above may be used alone, or a combination of two or more solvents may be used.

In one embodiment, the total blend amount of the organic solvents contained in the treatment: liquid, relative to the total mass of the treatment liquid, is preferably within a range from 0.1 to 50% by mass, more preferably from 0.15 to 30% by mass, and particularly preferably from 0.2 to 25% by mass. By adjusting the total blend amount of organic solvents so as to fall within the above range, a treatment liquid having favorable drying properties, moisture retention and wetting properties can be obtained, and any deterioration in the coating film durability cause by residual organic solvent can be prevented.

<Surfactant>

In one embodiment, the treatment liquid described above preferably also uses a surfactant in order to adjust the surface tension and improve the wettability of the recording medium. Many types of surfactants exist, including nonionic surfactants, anionic surfactants and cationic surfactants. In one embodiment, when a surfactant is used in the treatment liquid described above, from the viewpoints of improving the wetting properties of the treatment liquid without impairing the aggregation function of the calcium nitrate, a non-ionic surfactant is preferably selected. A single surfactant may be used alone, or a combination of two or more surfactants may be used.

Many types of nonionic surfactants are known, including acetylene-based, siloxane-based, acrylic-based and fluorine-based surfactants. From the viewpoint of achieving a combination of favorable wetting properties for the treatment liquid, good wetting properties for the subsequently applied inkjet ink, and favorable printing stability for the treatment liquid, in one embodiment, the use of an acetylene-based surfactant and/or a siloxane-based surfactant is preferred. In one embodiment, it is particularly preferable that the treatment liquid contains at least an acetylene-based surfactant.

Of the various possibilities, in the various coating methods described below, in order to form a uniform aggregation layer, it is necessary that the surfactant orients rapidly at the surface, thereby lowering and stabilizing the surface tension. From these viewpoints, it is particularly desirable that the treatment liquid contains a compound represented by general formula (1) shown below as an acetylene-based surfactant.

[Chemical formula 1]

General formula (1)

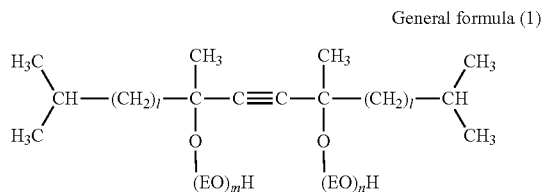

In general formula (1), $l$ represents an integer of 1 to 3, $m$ represents an integer of 0 or greater, $n$ represents an integer of 0 or greater, and $m+n$ is an integer of 1 to 30. Further, EO represents an ethylene oxide group. Among the various possibilities, compounds of general formula (1) in which $l$ is 1 or 2 and $m+n$ is an integer of 5 to 20 are preferred.

The acetylene-based surfactant that is used may be synthesized using conventional methods, or a commercially available product may be used, Examples of commercially available products that may be used include Surfynol 61, 104E, 104H, 104A, 104BC, 104DPM, 104PA, 104PG-50, 420, 440, 465, 485, SE and SE-F, and Dynol 604 and 607 (all manufactured by Air Products and Chemicals, Inc), and OLFINE E1004, E1010, E1020, PD-001, PD-002W, PD-004, PD-005, EXP. 4001, EXP. 4200, EXP. 4123 and EXP. 4300 (all manufactured by Nissin Chemical Co., Ltd.).

Among the commercially available products listed above, examples of compounds represented by the above general formula (1) include Surfynol 420, 440, 465 and 485, Dynol 604 and 607, and OLFINE E1004 and E1010. Among these, Surfynol 465, Dynol 607 and OLFINE E1010 correspond with compounds of general formula (1) in which $l$ is 1 or 2, and $m+n$ represents an integer of 5 to 20.

Further, in those cases where a siloxane-based surfactant is used, from the viewpoints of adjusting the functionality as a surfactant and the solubility in aqueous media, the use of a modified siloxane-based surfactant containing any of various introduced organic groups is preferred. Among such surfactants, polyether-modified siloxane-based surfactants using a polyether group as the organic group are preferred. In these surfactants, the hydrophilicity or hydrophobicity of the surfactant can be controlled as desired by adjusting the number of ethylene oxide groups or propylene oxide groups that constitute the polyether group, and because the speed of orientation of these surfactants at the interface is excellent, these surfactants can be used particularly favorably in the treatment liquid described above.

Siloxane-based surfactants that can be used favorably may be synthesized using conventional methods, or may be commercially available products. Examples of commercially available products that may be used include BY16-201, FZ-77, FZ-2104, FZ-2110, FZ-2162, F-2123, L-7001, L-7002, SF8427, SF8428, SH3749, SH8400, 8032 Additive and SH3773M (all manufactured by Dow Corning Toray Co., Ltd.), TEGO Glide 410, TEGO Glide 432, TEGO Glide 435, TEGO Glide 440, TEGO Glide 450, TEGO Twin 4000, TEGO Twin 4100, TEGO Wet 250, TEGO Wet 260, TEGO Wet 270 and TEGO Wet 280 (all manufactured by Evonik Degussa GmbH), SAG-002 and SAG-503A (manufactured by Nissin Chemical Co., Ltd.), BYK-331, BYK-333, BYK-345, BYK-346, BYK-347, BYK-348, BYK-349, BYK-UV3500, and BYK-UV3510 (all manufactured by BYK-Chemie GmbH), and KF-351A, KF-352A, KF-353, KF-354L, KF355A, KF-615A, KF-640, KF-642, and KF-643 (all manufactured by Shin-Etsu Chemical Co., Ltd.).

In one embodiment, a surfactant having an HLB value measured by Griffin's method that is greater than 5 but less than 15 is preferably selected. The HLB (Hydrophile-Lipophile Balance) value is a parameter that indicates the hydrophilic and hydrophobic properties of a material, wherein a smaller HLB value indicates higher hydrophobicity. In other words, it is thought that a smaller HLB value for the surfactant indicates a faster orientation speed at the treatment liquid surface, resulting in improved instantaneous wet spreading on the recording medium during high-speed printing, and enhanced image uniformity. In one embodiment, a surfactant having an HLB value of at least 5 but less than 15 can be used favorably. This embodiment enables printed matter having superior image uniformity to be more easily obtained on recording media having different water absorption properties.

In those cases where the treatment liquid contains a surfactant, the amount added of the surfactant, relative to the total mass of the treatment liquid, is preferably within a range from 0.1% to 3.0% by mass, and particularly preferably from 0.15 to 2.0% by mass. By adding the surfactant in an amount that falls within the above range, satisfactory wetting of the recording medium can be achieved regardless of the coating method and even in the case of high-speed printing. Further, printed matter having superior image uniformity can be obtained, with no deterioration in the coating quality such as cissing. However, the blend amount of the surfactant is preferably determined with due consideration of the surface tension of the inkjet ink described below.

<Binder Resin>

In one embodiment, the treatment liquid described above may also contain a binder resin. A binder resin is a resin that does not participate in the reaction between the inkjet ink and the treatment liquid. By also including a binder resin, the water resistance of the printed matter can be improved, meaning the printed matter can be used in a variety of different applications. Generally, water-soluble resins and resin microparticles are known as binder resins. Either of these types of binder resins may be used in the above embodiment. In one embodiment, from the viewpoint of mixing instantly with the inkjet ink, thereby enabling the aggregation function of the treatment liquid to manifest more effectively during high-speed printing, selection of a water-soluble resin is preferred.

The amount of the above binder resin is preferably specified relative to the amount of metal ions. Specifically, the mass ratio of the amount of the binder resin relative to the amount of metal ions contained in the treatment liquid, expressed as an amount of the binder resin relative to a value of 1 for the amount of metal ions, is preferably greater than 0 but less than 50, and particularly preferably greater than 0 but less than 30. When the mass ratio falls within this range, the water resistance of the printed matter improves, and printed matter of high image quality can be obtained, with no waviness (a phenomenon in which a portion of the recording medium absorbs water, leading to localized expansion and the formation of a wave-like shape) or curling (curving of the recording medium caused by moisture).

Any desired resin may be used as the binder resin. Among the various possible resins, nonionic water-soluble resins are preferred. Using a nonionic water-soluble resin is effective in improving the water resistance and suppressing waviness and curling. Provided the basic performance of the treatment liquid can be maintained, a resin that also includes an added anionic unit or cationic unit in the nonionic water-soluble resin may be used.

Specific examples of binder resins that may be used include polyethyleneimines, polyamides, various quaternary ammonium salt group-containing water-soluble resins, polyacrylamides, polyvinylpyrrolidones, polyalkylene oxides, starches, water-soluble celluloses such as methyl cellulose, hydroxy cellulose, carboxymethyl cellulose, hydroxymethyl cellulose, hydroxypropyl cellulose and hydroxypropyl methylcellulose, polyvinyl methyl ethers, polyvinyl acetals, polyvinyl alcohols, and modified products of the above resins. Further, provided stability relative to the calcium nitrate is maintained, (meth)acrylic resins, styrene-(meth) acrylic resins, maleic acid resins, styrene-maleic acid resins, urethane resins, and ester resins and the like may also be used, but of course this is not an exhaustive list.

In this description, the term "(meth)acrylic" means "acrylic" and/or "methacrylic".

Among the binder resins listed above, from the viewpoint of being able to absorb the liquid components in the subsequently printed inkjet ink, thereby dramatically improving the drying properties during high-speed printing, the use of at least one resin selected from the group consisting of polyvinyl alcohols, polyvinylpyrrolidones, polyvinyl acetals, polyalkylene oxides, cellulose derivatives, (meth) acrylic resins and styrene-(meth)acrylic resins is preferred. The use of at least one resin selected from the group consisting of polyvinyl alcohols, (meth)acrylic resins and styrene-(meth)acrylic resins is particularly preferred. These resins are preferred from the viewpoints of having the types of physical properties required for inkjet ink treatment liquids, such as favorable transparency, coating film durability and adhesion, as well as being readily available, and being available in a variety of forms including modified products.

Among the above resins, in the case of polyvinyl alcohols, in terms of enabling suppression of any reduction in the pH of the treatment liquid over time, it is most desirable to use a polyvinyl alcohol having a degree of saponification of at least 95% (a completely saponified product). In other words, by using a polyvinyl alcohol having a degree of saponification of at least 95%, in addition to the effects of improving the water resistance and suppressing waviness and curling, a treatment liquid layer having superior gloss, transparency and inkjet ink absorption can be obtained, and a treatment liquid that exhibits excellent pH stability over time can be obtained. Further, in terms of acrylic resins and/or styrene-acrylic resins, from the viewpoints of preventing reaction with the calcium nitrate in the treatment liquid, obtaining a treatment liquid that exhibits favorable pH and viscosity stability over time and has an excellent aggregation effect, and obtaining printed matter with excellent water resistance and gloss, and superior suppression of waviness and curling, selection of a resin having an acid value of not more than 100 is most desirable. The acid value can be measured using the same method as that described below for pigment dispersing resins.

In one embodiment, in the case where the treatment liquid contains a binder resin, the number average molecular weight (Mn) of the binder resin is preferably within a range from 3,000 to 90,000, and particularly preferably from 4,000 to 86,000. Provided the binder resin has number average molecular weight within this range, the typically desired level of water resistance can be satisfactorily achieved, and waviness or curling of the recording medium caused by swelling of the treatment liquid layer is less likely to occur. Furthermore, movement of the calcium ions is not impaired, meaning no deterioration in the aggregation effect occurs. Moreover, by using a binder resin having a number average molecular weight within the above range, the viscosity of the treatment liquid can be easily adjusted to a value within the preferred range.

The number average molecular weight described above can be measured by typical methods. in one example, Mn can be measured as a polystyrene-equivalent number average molecular weight, using a TSKgel column (manufactured by Tosoh Corporation) and a GPC (HLC-8120GPC, manufactured by Tosoh Corporation) fitted with an RI detector, using THF as the eluent.

<pH of Treatment Liquid>

In one embodiment, the pH of the treatment liquid is preferably within a range from 3.5 to 10.5. Provided the treatment liquid has a pH that fails within this range, even during high-speed printing, the flow of calcium ions is not inhibited by excess hydrogen ions or hydroxide ions, color mixing is suppressed, and printed matter having excellent dot circularity can be obtained. The pH of the treatment liquid is more preferably within a range from 5 to 10. Provided the pH falls within this range, the effects of the calcium nitrate manifest to the greatest extent, and dot circularity can be maintained even when printing at 100 m/min or faster.

The above pH can be measured by conventional methods. For example, measurement can be performed using a desktop pH meter F-72 manufactured by Horiba, Ltd., and either a standard ToupH electrode or a sleeve ToupH electrode.

<pH Adjuster>

In one embodiment, the treatment liquid may also contain a pH adjuster to adjust the pH range. A pH adjuster is a material that suppresses pH fluctuations caused by environmental changes, such as a reduction in pH caused by the absorption of carbon dioxide from the atmosphere, and has the function of maintaining the pH of the treatment liquid at a constant level. Any material having a pH-adjusting function may be selected as the pH adjuster.

Although not a particular restriction, in those cases where basification is required, alkanolamines such as dimethylethanolamine, diethanolamine, triethanolamine, N-methyldiethanolamine and 2-amino-2-methyl-1-propanol; other primary amines, secondary amines, tertiary amines and quaternary ammonium salts; ammonia water; alkali metal hydroxides such as lithium hydroxide, sodium hydroxide and potassium hydroxide; alkali metal carbonates such as lithium carbonate, sodium carbonate, sodium hydrogen carbonate and potassium carbonate may be used as basic pH adjusters. Further, in those cases where acidification is required, various inorganic acids such as hydrochloric acid, sulfuric acid, nitric acid, phosphoric acid and boric acid; various organic acids such as acetic acid, citric acid, succinic acid, tartaric acid, malic acid, fumaric acid, malonic acid, ascorbic acid and glutamic acid; and acetate salts of alkali metals such as lithium acetate and sodium acetate may be used as acidic pH adjusters.

Any of the above pH adjusters may be used alone, or a combination of two or more pH adjusters may be used. Among the various possibilities, in terms of not affecting the aggregation action of the calcium nitrate, an organic pH adjuster that does not contain a metal ion component is preferred. From this type of viewpoint, an alkanolamine is preferred as a basic pH adjuster. Hydrochloric acid is preferred as an acidic pH adjuster. From the viewpoints of the pH stability over time, and ensuring favorable manifestation of the aggregation effect of the calcium nitrate, at least a basic pH adjuster is preferably included in the treatment liquid.

The blend amount of the pH adjuster is preferably within a range from 0.01 to 5% by mass relative to the total mass of the treatment liquid. By ensuring that the blend amount of the pH adjuster falls within this range, pH adjustment of the treatment liquid is possible without impairing the function of the calcium nitrate in the treatment liquid. Further, a blend amount within the above range is also preferred from the viewpoints of safety and odor. Moreover, from the viewpoints of maintaining the pH in a stable manner even during lengthy or continuous anchor coating, and ensuring satisfactory drying properties for the treatment liquid even during high-speed coating, the above blend amount is more preferably within a range from 0.15 to 3% by mass.

In the treatment liquid described above, from the viewpoint of preventing drying and solidification inside the coating device during the treatment liquid coating process, the boiling point of the pH adjuster is preferably at least 50° C. On the other hand, from the viewpoint of preventing any deterioration in the drying properties during high-speed printing, the boiling point of the pH adjuster is preferably not higher than 400° C.

In the treatment liquid described above, the molecular weight of the pH adjuster, expressed as a weight average molecular weight (Mw), is preferably not more than 500. By using a pH adjuster having this type of molecular weight, coating irregularities of the treatment liquid during high-speed printing can be ameliorated, and the viscosity of the treatment liquid can be kept within the preferred range. In those cases where the pH adjuster is composed of a single material, the above weight average molecular weight may be read as the molecular weight of the single material.

<Water>

The amount of water contained in the treatment liquid is preferably within a range from 10 to 90% by mass relative to the total mass of the treatment liquid.

<Other Components>

The treatment liquid may, if necessary, also contain suitable amounts of additives such as antifoaming agents and preservatives in order to achieve certain desired physical property values. In those cases where these types of additives are used, the amount added is preferably at least 0.01% by mass but not more than 10% by mass relative to the total mass of the treatment liquid.

<Method for Producing Treatment Liquid>

In one embodiment, the treatment liquid composed of the components described above can be produced, for example, by combining the calcium nitrate and water, and if required, an organic solvent, surfactant, binder resin, pH adjuster and additive components selected appropriately from among those described above, stirring and mixing the resulting mixture, and then performing filtering if required. However, the method for producing the treatment liquid is not limited to this method.

During the stirring and mixing, the mixture may be heated at a temperature within a range from 40 to 100° C. if necessary. However, in those cases where resin microparticles are used as the binder resin, the heating is preferably performed at a temperature no higher than the MFT (minimum film-forming temperature) of the resin microparticles.

Further, the filter pore size used during the filtering is not particularly limited, provided that coarse particles and dust can be removed. In one embodiment, the filter pore size is preferably from 0.3 to 100 μm, and more preferably from 0.5 to 50 μm. When filtering is performed, a single type of filter may be used, or a combination of a plurality of filters may be used.

<Specifications of Treatment Liquid>

In one embodiment, the treatment liquid preferably has a viscosity at 25° C. within a range from 5.5 to 18.5 mPa·s. Provided the viscosity of the treatment liquid satisfies this range, the treatment liquid can be applied without coating irregularities, and irregularities in the dot shape and deterioration in image uniformity can be prevented, regardless of the treatment liquid application method and the recording medium. Moreover, from the viewpoint of obtaining superior printed matter in terms of the recording medium wettability and the suppression of irregularities during drying, the above viscosity of the treatment liquid is more preferably within a range from 6 to 15 mPa·s.

The viscosity of the treatment liquid indicates a value measured using an E-type viscometer (in the embodiments of the present invention, a TVE25L viscometer, manufactured by Toki Sangyo Co., Ltd.).

Moreover, from the viewpoint of ensuring satisfactory wettability of a variety of recording media, the surface tension of the treatment liquid at 25° C. is preferably within a range from 20 to 75 mN/m, more preferably from 21 to 65 mN/m, and particularly preferably from 22 to 45 mN/m.

In one embodiment, from the viewpoint of preventing bleeding of the printed matter, the surface tension of the treatment liquid is preferably at least as high as the surface tension of the inkjet ink. By ensuring that the surface tension of the treatment liquid is greater than the surface tension of the inkjet ink, the amount of surfactant oriented at the coating film surface when applying the treatment liquid to the recording medium can be reduced. As a result, any excessive reduction in the surface energy of the treatment liquid layer can be prevented, meaning the wettability of the subsequently printed inkjet ink is favorable, and printed matter of high image quality with no bleeding and superior dot circularity can be obtained.

The surface tension of the treatment liquid can be measured, for example, using a surface tensiometer (CBVPZ manufactured by Kyowa Interface Science Co., Ltd.), using the platinum plate method in an atmosphere at 25° C.

<1-2> Inkjet Ink

The constituent elements of the inkjet ink are described below in further detail.

<Pigment>

In an ink set of the embodiment described above, from the viewpoint of exhibiting characteristics such as favorable water resistance, light resistance, weather resistance and gas resistance and the like, and from the viewpoint of exhibiting a faster aggregation speed than dyes when used with the treatment liquid described above during high-speed printing, the inkjet ink preferably contains a pigment as the colorant. Conventional organic pigments and inorganic pigments may be used as the pigment. The amount of these pigments, relative to the total mass of the inkjet ink, is preferably at least 2% by mass but not more than 15% by mass, more preferably at least 2.5% by mass but not more than 12% by mass, and particularly preferably at least 3% by mass but not more than 10% by mass. By ensuring that the pigment content (amount) falls within the above range, satisfactory color development can be achieved even with one-pass printing, and furthermore, the viscosity of the inkjet ink can be adjusted to a value within a range that is appropriate for inkjet printing, and as a result, the long-term printing stability can be favorably maintained.

Examples of cyan organic pigments that may be used include C.I. Pigment Blue 1, 2, 3, 15:3, 15:4, 15:6, 16, 22, 60, 64 and 66. Of these, form the viewpoints of offering superior color development and light resistance, the selection of at least one pigment selected from the group consisting of C.I. Pigment Blue 15:3 and 15:4 is preferred. Further, in order to improve the color reproducibility, a green pigment such as CI Pigment Green 7, 36, 43 or 58 may be mixed with the cyan pigment.

Examples of magenta organic pigments that may be used include C.I. Pigment Red 5, 7, 12, 22, 23, 31, 48 (Ca), 48 (Mn), 49, 52, 53, 57 (Ca), 57:1, 112, 122, 146, 147, 150, 185, 238, 242, 254, 255, 266, 269 and 282, and C.I. Pigment Violet 19, 23, 29, 30, 37, 40, 43 and 50. Of these, from the viewpoints of offering superior color development and light resistance, at least one pigment selected from the group consisting of C.I. Pigment Red 122, 146, 150, 185, 202, 209, 254, 266, 269 and 282 and C.I. Pigment Violet 19 is preferred. Pigments such as C.I. Pigment Red 150 and 185 yield particularly superior density when used in combination with the treatment liquid of an embodiment described above, and also yield printed matter having excellent color development following aggregation, and are consequently particularly desirable.

Examples of yellow organic pigments that may be used include C.I. Pigment Yellow 10, 11, 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185 and 213. Of these, from the viewpoint of offering superior color development, at least one pigment is preferably selected from the group consisting of C.I. Pigment Yellow 13, 14, 74, 139, 180, 185 and 213. Pigments such as C.I. Pigment Yellow 74, 139, 180 and 185 yield particularly superior density when used in combination with the treatment liquid of an embodiment described above, and also yield printed matter having excellent color development following aggregation, and are consequently particularly desirable.

Examples of black organic pigments that may be used include aniline black, Lumogen black, and azomethine azo black. Further, a plurality of color pigments selected from among the cyan pigments, magenta pigments and yellow pigments described above, and special color pigments such as the orange pigments, green pigments and brown pigments described below, may also be used to form a black pigment.

In the inkjet ink described above, special color pigments such as orange pigments, green pigments and brown pigments may also be used. Specific examples include C.I. Pigment Orange 16, 36, 43, 51, 55, 59, 61, 64 and 71, C.I. Pigment Green 7, 36, 43 and 58, and C.I. Pigment Brown 23, 25 and 26. By using these special color pigments, printed matter having an even broader color gamut can be produced.

There are no particular limitations on the types of inorganic pigments that may be used, and examples include black pigments such as carbon blacks and iron oxide, and white pigments such as titanium oxide.

Examples of carbon black pigments that may be used include carbon blacks produced using the furnace method or the channel method. Of the various possibilities, carbon blacks produced using one of these methods, and having properties including a primary particle size of 11 to 50 nm, a specific surface area measured by the BET method of 50 to 400 m$^2$/g, a volatile fraction of 0.5 to 10% by mass, and a pH of 2 to 10 is preferred. Examples of commercially available products having these types of properties include: No. 25, 30, 33, 40, 44, 45, 52, 850, 900, 950, 960, 970, 980, 1000, 2200B, 2300, 2350 and 2600, and MA7, MA8, MA77, MA100 and MA230 (manufactured by Mitsubishi Chemical Corporation), RAVEN 760UP, 780UP, 860UP, 900P, 1000P, 1060UP, 1080UP and 1255 (manufactured by Columbian Carbon Company), REGAL 330R, 400R, 660R and MOGUL L (manufactured by Cabot Corporation), and Nipex 160IQ, 170IQ, 35 and 75, PrinteX 30, 35, 40, 45, 55, 75, 80, 85, 90, 95 and 300, Special Black 350 and 550, and Nerox 305, 500, 505, 600 and 605 (manufactured by Orion Engineered Carbons S.A.), and any of these carbon blacks can be used favorably.

Further, examples of titanium oxide that can be used favorably as a white inorganic pigment include both the anatase form and the rutile form. Use of the rutile form is preferred from the viewpoint of increasing the opacity of the printed matter. Further, titanium oxide produced by either the chlorine method or the sulfuric acid method may be used. Using titanium oxide produced by the chlorine method is preferred in terms of obtaining a higher degree of whiteness. Moreover, the use of titanium oxide having a pigment surface that has been treated with an inorganic compound ambler an organic compound is preferred. Among these, polyhydric alcohols or derivatives thereof yield a high degree of hydrophobization of the titanium oxide surface, enabling an improvement in the dispersion stability, and can therefore be used particularly favorably.

In one embodiment, from the viewpoint of adjusting the hue and color development of the printed matter within desired ranges, a mixture of a plurality of the above pigments may be used, For example, in order to improve the color tone at low print ratios, a small amount of one or more pigments selected from among cyan organic pigments, magenta organic pigments, orange organic pigments and brown organic pigments may be added to a black ink that uses a carbon black pigment.

<Resins>

In this description, the "resins" included inkjet ink are defined as including a pigment dispersing resin and a binder resin described below. The amount of resins incorporated in the inkjet ink of the embodiment described above (namely, the total amount of the pigment dispersing resin and the binder resin), expressed as a solid fraction amount, is preferably within a range from 30% by mass to 90% by mass relative to the total solid fraction of the inkjet ink. Provided the amount of resins falls within this range, printed matter having satisfactory water resistance for a coating film can be obtained. The amount of the above resins is more preferably within a range from 35 to 80% by mass, and particularly preferably from 40 to 70% by mass.

Examples of the types of resins that can be used favorably include (meth)acrylic resins, styrene-(meth)acrylic resins, urethane resins, maleic acid resins, styrene-maleic acid resins, and unsaturated polyester resins. Among these, at least one resin selected from among (meth)acrylic resins, styrene-(meth)acrylic resins and urethane resins is preferred.

<Pigment Dispersing Resin>

In the inkjet ink, examples of methods for stably dispersing the above pigment and maintaining that dispersion include: (1) methods of achieving dispersion by adsorbing a water-soluble pigment dispersing resin to the pigment surface, (2) methods of achieving dispersion by adsorbing a water-soluble and/or water-dispersible surfactant to the pigment surface, (3) methods of chemically or physically introducing a hydrophilic functional group at the pigment surface, thereby achieving dispersion in the ink without requiring a dispersing resin or a surfactant (self-dispersing pigments), and (4) methods of achieving dispersion in the ink by coating the pigment with a water-insoluble resin, and also using a water-soluble pigment dispersing resin or surfactant as required.

In one embodiment, the inkjet ink preferably uses a pigment that is dispersed using a method other than the above method (3) (namely, a method that uses a self-dispersing pigment). The ink set of the embodiment described above intentionally uses the insolubilization caused by the calcium ions of the treatment liquid to suppress image defects such as color mixing. Accordingly, enabling anion-cation interaction reactions or adsorption equilibrium movement reactions between the calcium ions and the high-molecular weight components such as the aforementioned resin and surfactant enhances the thickening and fluidity reduction effects caused by the pigment component, enabling the image defects mentioned above to be suppressed even during high-speed printing.

Moreover, of the methods described above, the selection of method (1) or (4) is preferred. In other words, the pigment is more preferably dispersed using a pigment dispersing resin, and selection of the above method (1) that uses a pigment dispersing resin is particularly desirable. In this method, by appropriate investigation and selection of the composition and molecular weights of the polymerizable monomers that constitute the pigment dispersing resin, the resin adsorption capability to the pigment and the electric charge of the pigment dispersing resin can be easily adjusted. As a result, the pigment dispersing resin is able to impart good dispersion stability to fine pigments, and can control the ability of the treatment liquid to reduce the dispersibility of the pigment.

There are no particular limitations on the type of pigment dispersing resin, and examples of resins that may be used include (meth)acrylic resins, styrene-(meth)acrylic resins, urethane resins, maleic acid resins, styrene-maleic acid resins, and unsaturated polyester resins and the like. In one embodiment, from the viewpoint of having a greater range of selectable materials, from the viewpoint of ease of synthesis, and from the viewpoint of achieving an appropriate aggregation speed due to the charge neutralization and insolubilization of the calcium nitrate, the use of at least one resin selected from among (meth)acrylic resins, styrene-(meth)acrylic resins and urethane resins is particularly preferred. The pigment dispersing resin may be a resin synthesized using a conventional method, or a commercially available resin may be used.

In one embodiment, an alkyl group of 8 to 36 carbon atoms is preferably introduced into the pigment dispersing resin. When the alkyl group introduced into the pigment dispersing resin has 8 to 36 carbon atoms, the viscosity of the pigment dispersion can be lowered, superior viscosity stability (storage stability) can be achieved, and better dispersion stability (particle size stability) can be more easily achieved. Further, the thickening and fluidity reduction effects caused by the pigment component following the anion-cation interaction reaction or adsorption equilibrium movement reaction with the calcium ions are extremely large.

The number of carbon atoms in the alkyl group is preferably from 10 to 34, more preferably from 12 to 30, and even more preferably from 18 to 24. Provided the number of carbon atoms in the alkyl group is within the range from 8 to 36, linear or branched groups may be used, but a linear alkyl group is preferred. Examples of the linear alkyl group include an octyl group (C8), decyl group (C10), lauryl group (C12), myristyl group (C14), cetyl group (C16), stearyl group (C18), arachyl group (C20), behenyl group (C22), lignoceryl group (C24), cerotyl group (C26), montanyl group (C28), melissyl group (C30), dotriacontanyl group (C32), tetratriacontanyl group (C34), and hexatriacontanyl group (C36).

In one embodiment, from the viewpoint of achieving a combination of reduced viscosity for the pigment dispersion and improved coating film durability and gloss for the printed matter, the amount, in the copolymer, of the monomer (structural unit) having an alkyl chain of 8 to 36 carbon atoms contained within the pigment dispersing resin is preferably within a range from 5% by mass to 60% by mass, more preferably from 10% by mass to 55% by mass, and particularly preferably from 20% by mass to 50% by mass.

In one embodiment, in terms of improving the adsorption capability to the pigment, and enabling a rapid reduction in the pigment dispersibility upon mixing with the treatment liquid, it is particularly desirable that an aromatic group is introduced into the pigment dispersing resin. This is because when the treatment liquid and the inkjet ink are mixed, powerful intermolecular forces called cation-π interactions occur between the calcium ions contained in the treatment liquid and the pigment dispersing resin having the aromatic group, causing the two to undergo preferential adsorption. Examples of the aromatic group include a phenyl group, naphthyl group, anthryl group, tolyl group, xylyl group, mesityl group and anisyl group. Of these, a phenyl group or tolyl group is preferred in terms of ensuring satisfactory dispersion stability.

From the viewpoint of achieving a combination of good pigment dispersion stability and favorable adsorption performance with the treatment liquid, the amount of the monomer (structural unit) containing the aromatic ring (aromatic group), relative to the total mass of the pigment dispersing resin, is preferably within a range from 5 to 65% by mass, and more preferably from 10 to 50% by mass.

In one embodiment, the acid value of the pigment dispersing resin is preferably within a range from 20 to 300 mgKOH/g, and more preferably from 50 to 250 mgKOH/g. Adjusting the acid value to a value within this range satisfactorily enhances the reduction effect on the dispersion function upon mixing with the calcium ions in the treatment liquid, enabling images of extremely high image quality to be obtained. Further, the ink storage stability improves, meaning a dispersed state similar to that initially obtained can be maintained even after storage of the ink for long periods, and printed matter having aggregation and coverage properties similar to those initially obtained can be obtained. Furthermore, the ink jetting stability also improves.

The acid value can be measured by a potentiometric titration method using a conventional device, such as the automatic potentiometric titrator AT-610 manufactured by Kyoto Electronics Manufacturing Co., Ltd.

The weight average molecular weight of the pigment dispersing resin is preferably at least 1,000 but not more than 100,000. When the weight average molecular weight falls within the above range, the pigment can be more easily dispersed stably in water, and the viscosity of the ink can be more easily adjusted. Further, when the weight average molecular weight is at least 1,000, detachment of the pigment dispersing resin adsorbed to the pigment or coating the pigment can be prevented, meaning the dispersion stability can be favorably maintained. Provided the weight average molecular weight is not more than 100,000, the viscosity upon dispersion can be kept within a favorable range, any deterioration in the jetting stability from the inkjet head is prevented, and an ink having favorable printing stability can be obtained.

Moreover, the weight average molecular weight of the water-soluble pigment dispersing resin is more preferably at least 5,000 but not more than 50,000. When the weight average molecular weight falls within this range, ink thickening occurs upon insolubilization by the calcium ions, and even during high-speed printing, color mixing is suppressed, and images of high image quality can be obtained. Further, the continuous jetting stability during high-speed printing can also be favorably maintained.

In one embodiment, the above method (1) is preferably selected as the method for stably dispersing the pigment in the ink and maintaining that dispersion. More specifically, when a water-soluble pigment dispersing resin is used as the above pigment dispersing resin, in order to increase the solubility of the resin in the ink, the acid groups in the pigment dispersing resin are preferably neutralized with a base. On the other hand, if an excess of base is introduced to effect the neutralization, then the calcium ions contained in the treatment liquid are also neutralized, making it difficult to achieve satisfactory effects, and therefore considerable care must be taken with the amount added of the base. Whether or not the amount added of the base is excessive can be confirmed, for example, by preparing a 10% by mass aqueous solution of the water-soluble pigment dispersing resin and then measuring the pH of the aqueous solution. In one embodiment, in order to ensure satisfactory manifestation of the functions of the treatment liquid, the pH of the above aqueous solution is preferably within a range from 7 to 11, and more preferably from 7.5 to 10.5.

Examples of bases that may be used for neutralizing the water-soluble pigment dispersing resin include alkanolamines such as diethanolamine, triethanolamine and N-methyldiethanolamine; ammonia water; alkali metal hydroxides such as lithium hydroxide, sodium hydroxide and potassium hydroxide; and alkali metal carbonates such as lithium carbonate, sodium carbonate, sodium hydrogen carbonate and potassium carbonate.

In those cases where the above method (1) is selected, the blend amount of the water-soluble pigment dispersing resin relative to the pigment is preferably within a range from 1 to 50% by mass Ensuring that the blend amount of the pigment dispersing resin is within this range from 1 to 50% by mass relative to the pigment suppresses any viscosity increase of the pigment dispersion, improves the viscosity stability and dispersion stability of the pigment dispersion and the inkjet ink, and ensures a rapid reduction in the dispersion function upon mixing with the treatment liquid. The blend amount (ratio) of the water-soluble pigment dispersing resin relative to the pigment is more preferably within a range from 2 to 45% by mass, even more preferably from 4 to 40% by mass, and most preferably from 5 to 35% by mass.

<Binder Resin>

In one embodiment, a binder resin may be added to the inkjet ink if necessary. Generally known binder resins include resin microparticles and water-soluble resins, and either one may be used alone, or a combination of both may be used.

The aforementioned resin microparticles can use a resin having a higher molecular weight than water-soluble resins, and can also lower the viscosity of the inkjet ink, meaning a larger amount of the resin can be added to the inkjet ink, which is ideal for dramatically enhancing the coating film durability of the printed matter.

Examples of resins that may be used for the resin microparticles include (meth)acrylic resins, styrene-(meth)acrylic resins, urethane resins, maleic acid resins, styrene-maleic acid resins, unsaturated polyester resins, styrene-butadiene resins, ethylene-vinyl acetate resins, vinyl chloride resins, and vinyl chloride-vinyl acetate resins. If consideration is given to achieving favorable ink storage stability, good coating film durability for the printed matter, a broad range of selectable materials, favorable compatibility upon mixing with the calcium nitrate, and superior printed matter with no whitening, then one or more types of resin microparticles selected from the group consisting of (meth)acrylic resins, styrene-(meth)acrylic resins and urethane resins can be used particularly favorably.

When the binder resin in the inkjet ink is composed of resin microparticles, consideration must be given to the MFT of the resin microparticles. When resin microparticles having a low MFT are used, the variety of water-soluble organic solvent added to the inkjet ink can sometimes cause further reduction in the MFT of the resin microparticles, meaning fusion and aggregation of the resin microparticles may occur even at room temperature, and as a result, blockages of the inkjet head nozzles can sometimes occur. In order to avoid these problems, it is preferable that the MFT of the resin microparticles is set to 50° C. or higher by appropriate adjustment of the monomers that constitute the resin microparticles.

Furthermore, core-shell resin microparticles containing a core component composed of a resin having a low MFT and a shell component composed of resin microparticles having a high MFT may also be used as the binder resin. Conventional methods such as interface polymerization methods, suspension polymerization methods, in-situ polymerization methods, phase inversion emulsification methods, coacervation methods and in-liquid drying methods may be selected as appropriate as the method used for producing the core-shell resin microparticles.

The above MFT can be measured, for example, using an MFT Tester manufactured by Tester Sangyo Co., Ltd. Specifically, a 25% by mass aqueous solution of the resin microparticles is applied to a metal plate to which a temperature gradient can be applied located inside the MFT tester to form a wet film thickness of 300 μm. Next, a temperature gradient is applied to the metal plate, and following complete film formation of the resin microparticles, the temperature at the boundary between the region where whitening has occurred and a film has not been not obtained and the region where a transparent resin film has formed is read and recorded as the MFT.

On the other hand, when a water-soluble resin is used as the binder resin, the type of fusion and aggregation of the resin microparticles observed with the above resin microparticles does not occur. Accordingly, in cases such as when the maintainability of the inkjet printer requires improvement, selection of a water-soluble resin is preferred. In those cases where a water-soluble resin is selected, the weight average molecular weight of the water-soluble resin is preferably within a range from 3,000 to 50,000, more preferably within a range from 4,000 to 40,000, and particularly preferably within a range from 5,000 to 35,000. By ensuring that the weight average molecular weight is at least 10,000, favorable coating film durability can be achieved for the printed matter. On the other hand, by ensuring that the weight average molecular weight is not more than 50,000, an inkjet ink having superior jetting stability from the inkjet head and superior maintenance properties can be obtained.

In those cases where a water-soluble resin is use as the binder resin, examples of the types of resins that may be used as the water-soluble resin include (meth)acrylic resins, styrene-(meth)acrylic resins, urethane resins, maleic acid resins, styrene-maleic acid resins, unsaturated polyester resins, styrene-butadiene resins, vinyl alcohol resins, and cellulose resins. If consideration is given to achieving favorable ink storage stability, favorable compatibility with the aforementioned water-soluble organic solvent, a broad range of selectable materials, favorable compatibility upon mixing with the calcium nitrate, and superior printed matter with no whitening, then one or more water-soluble resins selected from the group consisting of (meth)acrylic resins, styrene-(meth)acrylic resins and urethane resins can be used particularly favorably.

In one embodiment, the binder resin preferably has an acid value within a range from 10 to 65 mgKOH/g. From this type of viewpoint, in one embodiment, the inkjet ink preferably contains a resin having an acid value within this range as the resin described above. Provided the resin has an acid. value within this range, when the inkjet ink is combined with the treatment liquid of an embodiment described above, resin aggregation occurs immediately, and printed matter having no color mixing and superior dot circularity can be obtained. Moreover, because the resin aggregates on the surface of the recording medium, the coating film durability also improves.

In those cases where a binder resin is used in the above inkjet ink, the amount of the binder resin, expressed as a solid fraction amount relative to the total mass of the inkjet ink, is preferably within a range from 1% by mass to 20% by mass, more preferably from 2 to 15% by mass, and particularly preferably from 3 to 10% by mass.

<Wax>

In one embodiment, besides the resin components described above, the inkjet ink preferably also contains a polyolefin wax emulsion (hereafter also referred to as simply "the wax"). Although the detailed reasons are unclear, these waxes are able to be dispersed stably in the ink even when used in combination with the above resins, and are ideal from the viewpoint of dramatically improving the rub fastness of the printed matter. In those cases where a paper substrate is used as the recording medium, the wax also yields printed matter that exhibits excellent adhesion to the paper substrate.

In those cases where a wax is used, the volume average particle size (D50) of the wax is preferably within a range from 10 to 200 nm, and more preferably from 20 to 180 nm. Provided the average particle size falls within this range, the functions described above are able to manifest favorably. Further, an ink having superior jetting stability that suffers no blockages of the inkjet nozzles can be obtained. The volume average particle size can be measured using the same method as that described below for measuring the average secondary particle size of the pigment.

In those cases where a combination of the above resins and a wax is used, the blend amount of the wax relative to the blend amount of the resins is preferably within a range from 5 to 80% by mass, and more preferably from 10 to 50% by mass. By adjusting the blend amount of the wax to a value within this range, the functions of both the resins and the wax can manifest favorably, without any mutual impairment.

Examples of polyolefins that can be used favorably for forming the wax include at least one polyolefin selected from among polyethylene, polypropylene and polybutene. Selection of a polyethylene wax is particularly preferred in terms of dramatically improving the abrasion resistance of the printed matter when used in combination with the treatment liquid of an embodiment described above. In terms of achieving satisfactory abrasion resistance even during high-speed printing, the blend amount of the polyethylene wax is preferably at least 0.5% of the total mass of the ink.

<Water-Soluble Organic Solvent>

In one embodiment where the inkjet ink contains an organic solvent, the inkjet ink may contain a single water-soluble organic solvent or a plurality of such solvents. Specific examples of water-soluble organic solvents that may be used in the inkjet ink include the same solvents as those mentioned above for the treatment liquid.

In one embodiment, from the viewpoints of obtaining an inkjet ink having superior moisture retention, drying properties and wetting properties, the total amount of water-soluble organic solvent in the inkjet ink, relative to the total mass of the inkjet ink, is preferably at least 6% by mass but not more than 70% by mass, more preferably at least 10% by mass but not more than 60% by mass, and particularly preferably at least 15% by mass but not more than 50% by mass.

<Boiling Point of Water-Soluble Organic Solvent>

In one embodiment, the amount of water-soluble organic solvent having a boiling point at one atmosphere of 240° C. or higher in the inkjet ink is preferably greater than 0% by mass but not more than 8% by mass relative to the total mass of the inkjet ink. This amount may be 0% by mass, By controlling the amount of such water-soluble organic solvents so as to satisfy the above range, printed matter having excellent coating film durability and drying properties, with no blocking (a phenomenon in which, when the printed matter is stacked or rolled, the back surface of the recording medium becomes marked with the ink), can be obtained, even during high-speed printing. Further, when the inkjet ink is combined with the treatment liquid of an embodiment described above, from the viewpoint of being able to obtain printed matter having excellent image quality even with high-speed printing, the amount of water-soluble organic solvent having a boiling point at one atmosphere of 240° C. or higher is particularly preferably not more than 7% by mass relative to the total mass of the inkjet ink.

The boiling point of the water-soluble organic solvent at one atmosphere can be measured sing a thermal analyzer such as a DSC (differential scanning calorimeter).

The weighted average boiling point at one atmosphere of the water-soluble organic solvents contained in the inkjet ink is preferably within a range from 175 to 245° C., more preferably from 180 to 235° C., even more preferably from 185 to 220° C., and particularly preferably from 190 to 210° C. When the weighted average boiling point of the water-soluble organic solvents falls within this range, the combination with the treatment liquid of an embodiment described above enables images of high image quality to be obtained even during high-speed printing, and also enables superior jetting stability to be obtained. The weighted average boiling point at one atmosphere is a value obtained by calculating, for each water-soluble organic solvent, the product of the boiling point at one atmosphere and the mass ratio of that organic solvent relative to the total mass of all of the water-soluble organic solvents, and then adding together the calculated products for the various water-soluble organic solvents.

<Surfactants>
<Acetylene-Based Surfactant>

In one embodiment, the inkjet ink contains a surfactant. Any conventionally known surfactant may be used as the surfactant, but inclusion of an acetylene-based surfactant is preferred. Acetylene-based surfactants orient at the interface very rapidly. An acetylene-based surfactant can orient at the ink droplet interface before the calcium nitrate in the treatment liquid causes pigment aggregation, enabling printed matter having excellent printed image quality to be obtained, with favorable coverage and no banding irregularities.

Examples of acetylene-based surfactants that may be used include surfactants synthesized using conventional methods and commercially available products. In those cases where a commercially available product is used, the types of surfactants described above for use in the treatment liquid may be used. In particular, in one embodiment, an acetylene-based surfactant having an HLB value measured by Griffin's method of at least 3 but not more than 12 is preferably selected.

In those cases where the inkjet ink contains an acetylene-based surfactant, from the viewpoint of obtaining printed matter having favorable printed image quality, the blend amount of the acetylene-based surfactant, relative to the total mass of the ink, is preferably within a range from 0.1 to 2.5% by mass, more preferably from 0.2 to 2.0% by mass, and particularly preferably from 0.4 to 1.5% by mass.

<Other Surfactants>

Moreover, in one embodiment, the inkjet ink may also contain a surfactant other than an acetylene-based surfactant (hereafter simply referred to as the "other surfactant"), provided this other surfactant does not impair the aggregation performance of the treatment liquid containing calcium nitrate. A single other surfactant may be used alone, or a combination of two or more such other surfactants may be used. Further, this other surfactant may be used in combination with, or separately from, the acetylene-based surfactant.

From the viewpoints of ensuring optimal wetting properties and achieving favorable jetting stability, the use of a siloxane-based surfactant and/or fluorine-based surfactant as the other surfactant is preferred, and the use of a siloxane-based surfactant is particularly desirable.

In those cases where a siloxane-based surfactant is used as the other surfactant, from the viewpoint of improving the speed of orientation at the ink interface and improving the jetting stability, a polyether-modified siloxane-based surfactant that uses a polyether group as an organic group is preferably selected. Further, from the viewpoint of the speed of orientation at the ink interface, the HLB value of the polyether-modified siloxane-based surfactant measured using Griffin's method is preferably within a range from 3 to 12, and more preferably from 3.5 to 11.

Further, the molecular weight of the surfactant is also important from the viewpoints of controlling the wettability during evaporation of the inkjet ink, and improving the quality of the printed matter such as the coating film durability and the solvent resistance. The molecular weight of the other surfactant, expressed as a weight average molecular weight, is preferably at least 1,000 but not more than 50,000, and more preferably at least 1,500 but not more than 40,000. By ensuring that the molecular weight of the surfactant is at least 1,000, the control effect on the wettability of the recording medium can be enhanced, whereas by ensuring that the molecular weight of the surfactant is not more than 50,000, an inkjet ink having excellent storage stability can be more easily obtained.

Examples of other surfactants that may be used include surfactants synthesized using conventional methods and commercially available products. When a commercially available surfactant is used, siloxane-based surfactants may be selected, for example, from among the specific examples of surfactants described above for use in the treatment liquid. Further, specific examples of fluorine-based surfactants include Zonyl TBS, FSP, FSA, FSN-100, FSN, FSO-100, FSO, FS-300, Capstone FS-30 and FS-31 (manufactured by E. I. du Pont de Nemours and Company), and PF-151N and PF-154N (manufactured by Omnova Solutions Inc.).

In those cases where the inkjet ink contains another surfactant, the amount added of that other surfactant, relative to the total mass of the ink, is preferably at least 0.01% by mass but not more than 3.0% by mass, and more preferably at least 0.05% by mass but not more than 2.5% by mass.

The surfactant used in the inkjet ink and the surfactant used in the treatment liquid may be the same or different. If mutually different surfactants are used, then as described above, the blend amounts are preferably determined with due care regarding the surface tensions of the surfactants.

<Water>

The water included in the inkjet ink is preferably not a typical water containing various ions, and the use of an ion-exchanged water (deionized water) is preferred.

The amount of water that may be used is preferably within a range from 20 to 90% by mass relative to the total mass of the ink.

<Other Components>

In one embodiment, in addition to the components described above, the inkjet ink may, if necessary, contain appropriate amounts of other additives such as pH adjusters, antifoaming agents, preservatives, infrared absorbers and ultraviolet absorbers in order to obtain an ink having certain desired physical property values. The blend amount of these additives is preferably at least 0.01% by mass but not more than 10% by mass relative to the total mass of the inkjet ink. For the pH adjuster, the materials mentioned above for use as the pH adjuster in the treatment liquid can be used favorably.

In one embodiment, it is preferable that the inkjet ink contains substantially no polymerizable monomers. Here, the expression "contains substantially no polymerizable monomers" means that no such monomers are added intentionally, but does not exclude the incorporation or generation of trace amounts of such monomers during production or storage of the inkjet ink. Specifically, the amount of polymerizable monomers relative to the total mass of the inkjet ink is preferably not more than 1% by mass, and even more preferably 0.5% by mass or less.

<Inkjet Ink Set>

In one embodiment, an inkjet ink of a single color may be used. In another embodiment, depending on the application, the inkjet inks may be used in the form of an inkjet ink set containing a combination of a plurality of colors. There are no particular limitations on the color combination, but full-color images can be obtained by using the three colors of cyan, yellow and magenta. Further, by also adding a black ink, the level of blackness can be improved, and the legibility of text and the like can be improved. Moreover, by also adding other colors such as orange and green, the color reproducibility can be improved. When printing is performed to recording media that is not white, including a white ink enables more distinct images to be obtained. In those cases where the inkjet inks include a magenta ink, as mentioned above, it is preferable that the magenta ink contains a pigment of high density in order to enable the production of printed matter having superior color development.

<Method for Producing Inkjet Ink>

The inkjet ink of an embodiment described above is composed of the types of components described above, and can be produced, for example, using the processes described below. However, the method for producing the inkjet ink is not limited to the processes described below.

(1) Production of Pigment Dispersion (When a Pigment Dispersing Resin is Used)

In those cases where a pigment dispersing resin is used in the inkjet ink, a pigment dispersion is prepared prior to preparation of the ink. For example, when a water-soluble pigment dispersing resin is used as the pigment dispersing resin, the water-soluble pigment dispersing resin and water, and a water-soluble organic solvent if required, are mixed together and stirred to produce a water-soluble pigment dispersing resin mixed solution. The pigment is then added to this water-soluble pigment dispersing resin mixed solution, and following mixing and stirring (premixing), a dispersing treatment is performed using a dispersion device. Subsequently, a centrifugal separation, filtration, or adjustment of the solid fraction concentration may be performed as required to obtain a pigment dispersion.

Further, when producing a dispersion of a pigment that has been coated with a water-insoluble resin, the water-insoluble resin is first dissolved in an organic solvent such as methyl ethyl ketone, and the water-insoluble resin is then neutralized as required to produce a solution of the water-insoluble resin. The pigment and water are then added to this solution of the water-insoluble resin, and following mixing and stirring (premixing), a dispersing treatment is performed using a dispersion device. Subsequently, the above organic solvent is removed by distillation under reduced pressure, and a centrifugal separation, filtration or adjustment of the solid fraction concentration may then be performed as required to obtain a pigment dispersion.

The dispersion device used during the pigment dispersing treatment may be any typically used dispersion device. Examples of devices that may be used include a ball mill, roll mill, sand mill, beads mill, nanomizer, paint shaker and microfluidizer.

Examples of methods for controlling the particle size distribution of the pigment contained in the pigment dispersion include increasing the amount of electric power imparted to the pigment dispersion during the dispersion, altering the shape of the stirring member (agitator), and performing a centrifugal separation or filtration or the like after the dispersing treatment. Further, in those cases where a media dispersion device such as a ball mill or beads mill is used as the dispersion device, additional methods include reducing the size of the media, altering the material used for the media, and increasing the media filling ratio. In one embodiment, in those cases where a media dispersion device is used, in order to ensure that the pigment size fills within the preferred particle size range, the diameter of the media is preferably within a range from 0.1 to 3 mm. Further, examples of materials that can be used favorably as the media include glass, zircon, zirconia and titania. A combination of two or more of the above methods may also be used to control the particle size distribution of the pigment.

(2) Preparation of Inkjet Ink

The inkjet ink can be obtained, for example, by adding the water-soluble organic solvent, the surfactant and water, and where necessary the binder resin and other additives described above, to the pigment dispersion produced in the manner described above, and then performing stirring and mixing.

If necessary, the mixture of the above components may be stirred and mixed while being heated at a temperature within a range from 40 to 100° C. However, when resin microparticles are used as the binder resin, the heating temperature is preferably not higher than the MFT of the resin microparticles.

(3) Removal of Coarse Particles

During the ink preparation, coarse particles contained in the above mixture are preferably removed using techniques such as filtration and centrifugal separation, thus obtaining the inkjet ink. Conventional methods may be used as appropriate for the filtration method. There are no particular limitations on the filter pore size, provided coarse particles and dust can be removed. For example, the filter pore size is preferably within a range from 0.3 to 5 μm, and more preferably from 0.5 to 3 μm. Further, when filtration is performed, a single type of filter may be used alone, or a combination of a plurality of filter types may be used.

<Properties of Inkjet Ink>

In one embodiment, the viscosity of the inkjet ink at 25° C. is preferably adjusted to value within a range from 3 to 20 mPa·s. Provided the ink has a viscosity within this range, stable jetting characteristics can be obtained, particularly from inkjet heads having a typical frequency of 4 to 10 kHz through to inkjet heads having a high frequency of 10 to 70 kHz. In particular, by ensuring that the viscosity of the ink at 25° C. is within a range from 3 to 14 mPa·s, stable jetting can be achieved even when using an inkjet head having a design resolution of 600 dpi or higher. The above viscosity values represents values measured with an E-type viscometer (specifically, a TVE25L viscometer, manufactured by Toki Sangyo Co., Ltd.) using 1 mL of the ink.

From the viewpoint of obtaining printed matter having excellent color development, the inkjet ink of an embodiment described above preferably contains a pigment having an average secondary particle size (D50) within a range from 40 nm to 500 nm, more preferably from 50 nm to 400 nm, and particularly preferably from 60 nm to 300 nm. In order to ensure that the average secondary particle size of the pigment falls within the above preferred range, the pigment dispersing treatment process is preferably controlled in the manner described above. The average secondary particle size represents the volume median size, and can be measured using a dynamic light scattering particle size distribution analyzer (for example, a Nanotrac UPA-EX150 manufactured by MicrotracBEL Corporation).

2. Method for Producing Printed Matter

One embodiment relates to a method for producing printed matter using an ink set of an embodiment described above. This method for producing printed matter using the ink set preferably includes a step of applying the treatment liquid to a recording medium, and a step of applying the inkjet ink in a state where the drying rate of the treatment liquid on the recording medium is 10% in terms of mass or less.

<Method for Applying Treatment Liquid>

In the method for producing printed matter according to the embodiment described above, prior to applying of the inkjet ink, the treatment liquid is applied to the recording medium. The method used for applying the treatment liquid to the recording medium may employ either a printing method that involves no contact with the recording medium such as inkjet printing, or a printing method that involves bringing the treatment liquid into contact with the recording medium. In those cases where inkjet printing is employed as the method for applying the treatment liquid, from the viewpoint of retaining the inherent texture of the recording medium in the unprinted portions, the treatment liquid is preferably only applied to those portions to which the inkjet ink is to be applied. Further, in those cases where a printing method that involves bringing the treatment liquid into contact with the recording medium is employed, from the viewpoints of apparatus simplicity, coating uniformity, operational efficiency, and economic viability and the like, a roller-type method is preferred employed. Here, a "roller-type method" means a printing method in which the treatment liquid is first applied to a rotating roller, and that treatment liquid is then transferred to the recording medium. Examples of coating devices that can use roller-type coating include offset gravure coaters, gravure coaters, doctor coaters, bar coaters, blade coaters, flexo coaters and roll coaters.

In one embodiment, the film thickness immediately following application of the treatment liquid to the recording medium, expressed as a wet thickness, is preferably within a range from 0.5 to 6 µm, and more preferably from 0.5 to 5.5 µm. By ensuring that the film thickness falls within this range, satisfactory water resistance can be maintained in those portions where the treatment liquid is applied but the inkjet ink is not applied. Moreover, satisfactory color mixing suppression and superior dot circularity can be achieved even during high-speed printing, and drying of the solvent components in the treatment liquid can be conducted satisfactorily. The film thickness of the treatment liquid is preferably determined with due consideration of the amount applied of the inkjet ink described below and the amount of residual treatment liquid on the recording medium.

<Treatment Liquid Dryness Ratio>

In one embodiment, during the inkjet ink application step described below, a state is preferably maintained in which the treatment liquid (treatment liquid layer) on the recording medium is not completely dry, so that the calcium nitrate in the treatment liquid layer remains in a dissociated state. Accordingly, it is particularly desirable that no thermal energy is applied to the recording medium in the period from application of the treatment liquid through to application of the inkjet ink. By applying the inkjet ink onto a treatment liquid layer that exists in a state in which the treatment liquid is not completely dry, with the calcium nitrate existing in a dissociated state, any loss associated with the time required to redissolve the calcium nitrate can be prevented. As a result, during high-speed printing, color mixing can be prevented, dot circularity can be maintained, and image defects such as inadequate coverage can be suppressed.

For the reasons outlined above, in one embodiment, the inkjet ink is preferably printed (applied) in a state where the dryness ratio of the treatment liquid on the recording medium is 10% or less. This "dryness ratio" can be calculated using the method described below in the examples.

On the other hand, in those cases where thermal energy is applied to the treatment liquid prior to the application of the inkjet ink, there are no restrictions on the method used for applying the thermal energy. For example, the same methods as those described below for applying thermal energy following application of the inkjet ink may be used. Further, a single thermal energy application method may be used alone, or a combination of a plurality of methods may be use.

<Treatment Liquid Application and Drying Device>

In one embodiment, a device for applying the treatment liquid, and a device for drying the treatment liquid that may be installed as required, may be installed in either an in-line arrangement or an off-line arrangement relative to the inkjet printing apparatus described below. In terms of convenience during printing, installation of these devices in an in-line arrangement is preferred.

<Method for Applying Inkjet Ink>

The inkjet ink is preferably applied to the recording medium using a one-pass printing method. One-pass printing is a printing method in which either the inkjet head is scanned only once across a stationary recording medium, or the recording medium is passed only once beneath a stationary inkjet head. In the case where the inkjet head is scanned, the jetting timing of the ink must be adjusted with due consideration of the movement of the inkjet head, and there is an increased likelihood of variation in the impact position. As a result, in one embodiment, a method in which the inkjet head is kept stationary and the recording medium is scanned is preferably used. In this method, the transport speed of the recording medium is preferably at least 50 m/min. Particularly in those cases where the treatment liquid application device is installed in an in-line arrangement relative to the inkjet printing apparatus, it is preferable that the treatment liquid application device and the inkjet printing apparatus are disposed in a continuous arrangement, so that the recording medium to which the treatment liquid has been applied can be simply transported to the inkjet printing section.

As already mentioned above, by using the ink set of an embodiment described above, images of high image quality can be produced even at high speed and even with a recording resolution of 600 dpi or higher. In one embodiment, from the viewpoint of providing printed matter having image quality similar to that achievable with offset printing or gravure printing, it is particularly preferable that the recording resolution of the printed matter is 1,200 dpi or higher.

<Inkjet Head>

In those cases where a method in which the recording medium is passed only once beneath a stationary inkjet head is employed as the one-pass printing method, the recording resolution in the recording width direction is determined by the design resolution of the inkjet head. In a similar manner to that mentioned above, in one embodiment, the recording resolution in the recording width direction is also preferably 600 dpi or higher. Consequently, the design resolution of the inkjet head is necessarily also preferably 600 dpi or higher, and is particularly preferably 1,200 dpi or higher Provided the design resolution of the inkjet head is 600 dpi or higher, printing of one color can be performed with a single inkjet head, which is preferable from the viewpoint of reducing the size of the apparatus and from an economic viewpoint. On the other hand, in those cases where an inkjet head having a design resolution lower than 600 dpi is used, by aligning a plurality of inkjet heads along the transport direction for the recording medium for one color, a recording resolution of 600 dpi or higher in the recording width direction can still be achieved by one-pass printing.

Furthermore, the print resolution in the transport direction of the recording medium is dependent not only on the design resolution of the inkjet head, but also on the drive frequency of the inkjet head and the printing speed. For example, the recording resolution in the transport direction can be doubled by either reducing the printing speed by ½, or by doubling the drive frequency. In those cases where, as a result of the design of the inkjet head, a print resolution of 600 dpi or higher cannot be achieved in the transport direction when the printing speed is 50 m/min or higher, by aligning a plurality of inkjet heads along the transport direction for the recording medium for one color, a combination of superior printing speed and print resolution can be achieved.

The drop volume for the inkjet ink in the inkjet one-pass printing method is significantly affected by the performance of the aforementioned inkjet head, but from the viewpoint of achieving high-quality images, the drop volume is preferably within a range from 1 to 20 pL. Furthermore, in order to obtain high-quality images, the use of an inkjet head with a graduated specification that enables the drop volume to be varied is particularly preferred.

<Application of Thermal Energy and Pressure Following Inkjet Ink Application>

Following application of the inkjet ink to the recording medium to which the treatment liquid has already been applied, thermal energy is preferably applied to the recording medium to dry the inkjet ink and the treatment liquid. Examples of thermal energy application methods and conditions for the drying of the treatment liquid. Examples include heating drying methods, hot air drying methods, infrared drying methods, microwave drying methods and drum drying methods. Further, from the viewpoint of enhancing the image uniformity and the coating film durability, a heated roller device or heated press device or the like may be used to apply pressure at the same time as the thermal energy.

From the viewpoints of preventing damage to the recording medium and preventing sudden boiling of the liquid components in the treatment liquid, in those cases where a heating drying method is employed, the drying temperature is preferably within a range from 35 to 100° C., whereas in those cases where a hot air drying method is employed, the temperature of the hot air is preferably from 50 to 250° C. Further, for similar reasons, in those cases where an infrared drying method is employed, at least 50% of the integrated value of the total output of infrared rays used in the infrared irradiation preferably exists in the wavelength region from at least 700 nm to not more than 1,500 nm.

The device used for applying thermal energy and pressure may be a single device, or a plurality of devices may be used consecutively or simultaneously. For example, by using a combination of a heating drying method and a hot air drying method, the treatment liquid can be dried more rapidly than those cases in which either method is used alone. Furthermore, the devices described above may be installed in either an in-line arrangement or an off-line arrangement relative to the inkjet printing apparatus, but from the viewpoint of convenience and the like during printing, installation in an in-line arrangement is preferred. Moreover, in one embodiment, from the viewpoints of preventing bleeding, color irregularities, and curling and the like of the recording medium, the thermal energy and pressure is preferably applied within 30 seconds of the completion of printing, and is more preferably applied within 20 seconds, and particularly preferably within 10 seconds.

<Amounts Applied of Treatment Liquid and Inkjet Ink>

The ratio of the amount applied of the inkjet ink, relative to the amount applied of the treatment liquid, is preferably at least 0.1 but not more than 10. This ratio of the amounts applied is more preferably at least 0.5 but not more than 9, and particularly preferably at least 1 but not more than 8. By ensuring that the ratio of the amounts applied falls within the above range, changes in the texture of the recording medium caused by excessive treatment liquid, and bleeding and color irregularities that can occur as a result of excessive inkjet ink and a deterioration in the effects of the treatment liquid can be suppressed, and high-quality printed matter can be obtained.

<Printing Speed>

In the method for producing printed matter using the ink set of the embodiment described above, the printing speed is preferably at least 50 m/min, more preferably at least 75 m/min, and particularly preferably 100 m/min or higher.

<Recording Medium>

When performing printing using the ink set of an embodiment described above, conventional recording media may be used as desired. For example, a paper substrate or synthetic paper substrate is preferably selected. In this description, the term "paper substrate" means a recording medium obtained by subjecting a material containing pulp to a papermaking process. The papermaking process may involve single-layer papermaking or multi-layer papermaking. Further, the surface of the paper may have a coating layer. Specific examples of paper substrates include high-quality papers, recycled papers, finely coated papers, coated papers, art papers, cast papers, liner papers, manila cardboards, and coated cardboards. Furthermore, "synthetic paper substrates" are recording media that contain a synthetic resin as the main raw material, and are recording media that have similar printing process characteristics to paper substrates.

The ink set of the embodiment described above can also be used on a variety of other substrates besides those described above, including various fabric substrates of cotton or silk or the like, and plastic substrates such as polyvinyl chloride sheets, PET films, polypropylene films and polyethylene films.

The recording medium may have a surface that is either smooth or uneven, and may be transparent, semi-transparent or opaque. Furthermore, a substrate obtained by bonding together two or more of the above recording media may also be used. Moreover, a releasable adhesive layer may be provided on the opposite side from the printing surface, or an adhesive layer or the like may be provided on the printed surface following printing. The recording medium may exist in a roll-type form or sheet-like form.

From the viewpoint of ensuring satisfactory manifestation of the effects of the ink set according to an embodiment described above even during high-speed printing, the calcium nitrate in the treatment liquid preferably exists in an amount within the prescribed range not only at the surface of the recording medium, but throughout the entire recording medium including the interior of the medium. Accordingly, the porosity and permeability of the recording medium, which affect the formation of the treatment liquid layer, are important. Based on a series of investigations of such recording media, the inventors of the present invention discovered that selection of a recording medium for which the amount of absorption of pure water, measured using a dynamic scanning absorption meter for a contact time of 100 msec, was within a range from 5 to 15 g/m² was preferable.

Further, as mentioned above, by combining a recording medium having such water absorption properties with a treatment liquid containing calcium nitrate which absorbs heat upon dissociation, feathering, and excessive permeation and bleeding of the printed matter can be suppressed, From this viewpoint, a combination of the treatment liquid of an embodiment described above and a recording medium having the above water absorption properties is a favorable combination.

Specific examples of recording medium which satisfy the above water absorption range include paper substrates such as high-quality papers, recycled papers, finely coated papers, coated papers, liner papers and manila cardboards. However, even for recording media of the same type, the types of inner layers and surface coating layers, and the thickness and the like can vary, and therefore the amount of water absorption is preferably actually measured using the method described below.

The amount of water absorption by the recording medium can be measured, for example, under the conditions described below. Using a KM500win device manufactured by Kumagai Riki Kogyo Co., Ltd. as the dynamic scanning absorption meter, and using a recording medium cut to a size of about 15 to 20 cm square, the true amount of movement can be measured under conditions of 23° C. and 50% RH and the additional conditions listed below.

Measurement method: Spiral method
Measurement start radius: 20 mm
Measurement end radius: 60 mm
Contact time: 10 to 1,000 msec
Sampling points: 19 (measured at substantially equal intervals relative to the square root of the contact time)
Scanning interval: 7 mm
Speed switching angle for rotating table: 863 degrees
Head box conditions: width 5 mm, slit width 1 mm <Printed Matter>

In one embodiment, printed matter is obtained by performing printing to a recording medium using the ink set of an embodiment described above. The thus produced printed matter exhibits excellent coating film durability and drying properties, and has superior image quality with no image defects such as color mixing and inadequate coverage, regardless of the type of recording medium used, and regardless of the printing conditions such as the printing speed and recording resolution.

EXAMPLES

The present invention is described below in further detail using a series of examples and comparative examples. In the following description, unless particularly stated otherwise, "parts" and "%" represent "parts by mass" and "% by mass" respectively.

<I> Preparation of Treatment Liquids
(1) Preparation Example for PVA103 Varnish

The materials described below were mixed at room temperature for one hour under constant stirring, and the temperature was then raised to 90° C. and mixing was continued for a further one hour. Subsequently, the thus obtained mixture was cooled to room temperature to obtain a PVA103 varnish.

PVA103 (a polyvinyl alcohol manufactured by Kuraray Co., Ltd. (degree of saponification: 98 to 99% (fully saponified), degree of polymerization: 300)) 25 parts
Ion-exchanged water 75 parts (2) Preparation Example for Treatment Liquid 1

A mixing container equipped with a stirrer was prepared, and the materials listed below were added sequentially to the container. The materials were mixed at room temperature for one hour under gentle stirring, and the temperature was then raised to 60° C. and mixing was continued for a further one hour. Subsequently, the thus obtained mixture was cooled to room temperature and filtered through a membrane filter having a pore size of 1 μm to obtain a treatment liquid 1.

(Materials)
Calcium nitrate tetrahydrate (manufactured by Yoneyama Chemical Industry Co., Ltd.) 31 parts
Triethanolamine (TEA) 1 part
35% hydrochloric acid (35% HCl) 0.62 parts
PVA103 varnish 10 parts
2-propanol (iPrOH) 4 parts
Surfynol 465 (an acetylene-based surfactant manufactured by Air Products and Chemicals, Inc.) 0.4 parts
PROXEL CAL (a preservative, a 1,2-benzisothiazol-3-one solution, manufactured by Arch Chemicals, Inc.) 0.05 parts
Ion-exchanged water 52.93 parts (3) Preparation Examples for Treatment Liquids 2 to 34

With the exception of using the materials shown in Table 1, the same method as that described for the treatment liquid I was used to prepare treatment liquids 2 to 34.

TABLE 1

| | | | Treatment liquid No. | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 |
| Blend amount (%) | Coagulant | Ca(NO₃)₂·4H₂O | 31 | 35 | 43 | 50 | 60 | 43 | 43 | 43 | 43 | 43 | 43 |
| | pH adjusters | Basic | TEA | 1 | 1 | 1 | 1 | 1 | 1 | 1 | 1 | 2 | | |
| | | | AMP | | | | | | | | | | 1 | |
| | | | CH₃COONa | | | | | | | | | | | 0.8 |
| | | Acidic | 35% HCl | 0.62 | 0.62 | 0.62 | 0.62 | 0.62 | 0.62 | 0.62 | 0.62 | 0.8 | | |
| | Binder resins | | PVA103 varnish (solid fraction: 25%) | 10 | 10 | 10 | 10 | 10 | 10 | 10 | | 10 | 10 | 10 |
| | | | BYK190 (solid fraction: 40%) | | | | | | | | 10 | | | |
| | Organic solvents | | Glycerol (boiling point: 290° C.) | | | | | | 4 | | | | | |
| | | | iPrOH (boiling point: 82° C.) | 4 | 4 | 4 | 4 | 4 | | | 4 | 4 | 4 | 4 |
| | | | 1,2-PD (boiling point: 188° C.) | | | | | | | 8 | | | | |
| | | | 1,2-HexD (boiling point: 224° C.) | | | | | | | | | | | |
| | Surfactants | Acetylene based | Surfynol 465 | 0.4 | 0.4 | 0.4 | 0.4 | 0.4 | 0.4 | 0.4 | 0.4 | 0.4 | 0.4 | 0.4 |
| | | | Surfynol 485 | | | | | | | | | | | |
| | | Siloxane based | BYK348 | | | | | | | | | | | |
| | Preservative | | PROXEL GXL | 0.05 | 0.05 | 0.05 | 0.05 | 0.05 | 0.05 | 0.05 | 0.05 | 0.05 | 0.05 | 0.05 |
| | | | Water | 52.93 | 48.93 | 40.93 | 33.93 | 23.93 | 40.93 | 36.93 | 40.93 | 39.75 | 41.55 | 41.75 |
| | | | Total | 100 | 100 | 100 | 100 | 100 | 100 | 100 | 100 | 100 | 100 | 100 |
| Specifications | Treatment liquid viscosity (mPa·s) | | | 6.0 | 6.4 | 6.8 | 7.2 | 7.6 | 12.0 | 15.0 | 5.5 | 8.0 | 6.5 | 6.5 |
| | Treatment liquid pH | | | 6.6 | 6.5 | 6.2 | 6.0 | 6.0 | 6.2 | 6.2 | 6.1 | 7.5 | 9.0 | 7.8 |
| | Calcium nitrate content (%) | | | 21.5 | 24.3 | 29.9 | 34.7 | 41.7 | 29.9 | 29.9 | 29.9 | 29.9 | 29.9 | 29.9 |
| | Amount of organic solvent having boiling point of 240° C. or higher (%) | | | 0.0 | 0.0 | 0.0 | 0.0 | 0.0 | 4.0 | 8.0 | 0.0 | 0.0 | 0.0 | 0.0 |

| | | | Treatment liquid No. | | | | | | | | | | |
|---|---|---|---|---|---|---|---|---|---|---|---|---|---|
| | | | 12 | 13 | 14 | 15 | 16 | 17 | 18 | 19 | 20 | 21 | 22 |
| Blend amount (%) | Coagulant | Ca(NO₃)₂·4H₂O | 43 | 43 | 43 | 43 | 43 | 43 | 43 | 43 | 43 | 43 | 43 |
| | pH adjusters | Basic | TEA | 1 | | | 1 | 1 | 1 | 1 | 1 | 1 | 1 | 1 |
| | | | AMP | | | | | | | | | | | |
| | | | CH₃COONa | | 1 | | | | | | | | | |
| | | Acidic | 35% HCl | | | | | 0.62 | 0.62 | 0.62 | 0.62 | 0.62 | 0.62 | 0.62 |
| | Binder resins | | PVA103 varnish (solid fraction: 25%) | 10 | 10 | 10 | 20 | 10 | 10 | 10 | 10 | 10 | 10 | 10 |
| | | | BYK190 (solid fraction: 40%) | | | | | | | | | | | |
| | Organic solvents | | Glycerol (boiling point: 290° C.) | | | | | | 10 | | | | | |
| | | | iPrOH (boiling point: 82° C.) | 4 | 4 | 4 | 4 | | | | | 4 | 4 | 4 |
| | | | 1,2-PD (boiling point: 188° C.) | | | | | | | | 4 | | | |

TABLE 1-continued

|  |  |  |  |  |  |  |  |  |  |  |  |  |  |
|---|---|---|---|---|---|---|---|---|---|---|---|---|---|
| | | 1,2-HexD (boiling point: 224° C.) | | | | | | | | | | 10 | | |
| | Surfactants | Acetylene based | Surfynol 465 | | | | | | | | | | | | |
| | | | Surfynol 485 | | | | | | | | | | | | |
| | | Siloxane based | BYK348 | 0.4 | 0.4 | 0.4 | 0.4 | 0.4 | 0.4 | 0.4 | 0.2 | 1 | 1 | 0.4 | 0.4 |
| | Preservative | | PROXEL GXL | 0.05 | 0.05 | 0.05 | 0.05 | 0.05 | 0.05 | 0.05 | 0.05 | 0.05 | 0.05 | 0.05 | 0.05 |
| | | | Water | 41.55 | 41.55 | 42.55 | 30.93 | 43.93 | 34.93 | 34.93 | 41.13 | 40.33 | 40.33 | 40.93 | 40.93 |
| | | | Total | 100 | 100 | 100 | 100 | 100 | 100 | 100 | 100 | 100 | 100 | 100 | 100 |
| Specifications | | | Treatment liquid viscosity (mPa·s) | 6.7 | 6.7 | 6.8 | 18.5 | 6.5 | 8.0 | 9.0 | 6.8 | 6.8 | 6.8 | 6.8 | 6.8 |
| | | | Treatment liquid pH | 10.5 | 3.5 | 6.2 | 6.2 | 6.1 | 6.1 | 6.1 | 6.2 | 6.2 | 6.2 | 6.2 | 6.2 |
| | | | Calcium nitrate content (%) | 29.9 | 29.9 | 29.9 | 29.9 | 29.9 | 29.9 | 29.9 | 29.9 | 29.9 | 29.9 | 29.9 | 29.9 |
| | | | Amount of organic solvent having boiling point of 240° C. or higher (%) | 0.0 | 0.0 | 0.0 | 0.0 | 0.0 | 4.0 | 8.0 | 0.0 | 0.0 | 0.0 | 0.0 | 0.0 |

|  |  |  |  | 23 | 24 | 25 | 26 | 27 | 28 | 29 | 30 | 31 | 32 | 33 | 34 |
|---|---|---|---|---|---|---|---|---|---|---|---|---|---|---|---|
| Blend amount (%) | Coagulant | | Ca(NO$_3$)$_2$·4H$_2$O | 25 | 70 | 43 | 43 | 43 | 43 | 43 | 43 | 30 | 40 | 37.8 | 34 |
| | | | [Al$_2$(OH)$_n$Cl$_{6-n}$]$_m$ | | | | | | | | | | | | |
| | pH adjusters | Basic | TEA | 1 | 1 | 1 | 1 | | 1 | 1 | 1 | | | | |
| | | | AMP | | | | | | 1 | | | | 40 | | |
| | | Acidic | 35% HCl | | | | | 1.4 | | | | | | | |
| | Binder resins | | PVA103 varnish (solid fraction: 25%) | 0.62 | 0.62 | 0.62 | 0.62 | | | 0.62 | 0.62 | 20 | 20 | | |
| | Organic solvents | | Glycerol (boiling point: 290° C.) | 10 | 10 | 10 | 10 | 10 | | | 30 | | | 7.3 | 5 |
| | | | MeOH (boiling point: 65° C.) | | | 10 | | | | | | | | | |
| | | | IPrOH (boiling point: 65° C.) | | | | | | | | | | | | |
| | | | IPrOH (boiling point: 82° C.) | 4 | 4 | | | 4 | | 4 | 4 | 4 | 4 | | |
| | | | MB (boiling point: 188° C.) | | | | 10 | | | | | 10 | 10 | | |
| | | | DEG (boiling point: 224° C.) | | | | | | 10 | | | | | 11 | 10 |
| | Surfactants | Acetylene based | Surfynol 465 | 0.4 | 0.4 | 0.4 | 0.4 | 0.4 | 0.4 | 0.4 | 0.4 | 0.5 | 0.5 | 0.7 | |
| | | | Surfynol 485 | | | | | | | | | | | | |
| | Preservative | | PROXEL GXL | 0.05 | 0.05 | 0.05 | 0.05 | 0.05 | 0.05 | 0.05 | 0.05 | 0.05 | 0.05 | 0.05 | 0.05 |
| | | | Water | 58.93 | 13.93 | 34.93 | 34.93 | 41.15 | 40.55 | 50.93 | 20.93 | 35.45 | 25.45 | 43.15 | 50.95 |
| Specifications | | | Total | 100 | 100 | 100 | 100 | 100 | 100 | 100 | 100 | 100 | 100 | 100 | 100 |
| | | | Treatment liquid viscosity (mPa·s) | 5.5 | 8.0 | 18.5 | 13.0 | 7.0 | 7.1 | 5.3 | 19.1 | 22.5 | 18.4 | 7.0 | 2.7 |
| | | | Treatment liquid pH | 6.5 | 6.2 | 6.1 | 6.1 | 3.0 | 11.5 | 6.1 | 6.1 | 5.0 | 3.0 | 7.8 | 3.0 |
| | | | Calcium nitrate content (%) | 17.4 | 48.6 | 29.9 | 29.9 | 29.9 | 29.9 | 29.9 | 29.9 | 20.8 | 0.0 | 26.3 | 23.6 |
| | | | Amount of organic solvent having boiling point of 240° C. or higher (%) | 0.0 | 0.0 | 10.0 | 10.0 | 0.0 | 4.0 | 8.0 | 0.0 | 0.0 | 0.0 | 18.3 | 10.0 |

Details regarding the abbreviations and product names for the materials shown in Table 1 are as follows.

<1> Coagulants

Ca(NO$_3$)$_2$·4H$_2$O: calcium nitrate tetrahydrate
[Al$_2$(OH)$_n$Cl$_{6-n}$]$_m$: polyaluminum chloride (manufactured by Taki Chemical Co., Ltd.)

<2> pH Adjusters

TEA: triethanolamine
AMP: 2-amino-2-methyl-1-propanol
CH$_3$COONa: sodium acetate
35% HCl: 35% hydrochloric acid <3> Binder Resins PVA1.03 varnish: a polyvinyl alcohol varnish described in the above preparation example.
BYK190: an aqueous solution of a styrene-maleic acid resin (solid fraction: 40%, acid value: 10 mgKOH/g) manufactured by BYK-Chemie Japan K.K.

<4> Organic Solvents

Glycerol: glycerol (boiling point: 290° C., surface tension: 62.0 mN/m)
iPrOH: 2-propanol (boiling point: 82° C., surface tension: 20.9 mN/m)
1,2-propanediol (boiling point: 188° C., surface tension: 35.1 mN/m)
1,2-HexD: 1,2-hexanediol (boiling point: 224° C., surface tension: 25.9 mN/m)
DEG: diethylene glycol (boiling point: 244° C., surface tension: 44.2 mN/m)
MeOH: methanol (boiling point: 65° C., surface tension: 22.6 mN/m)
MB: 3-methoxybutanol (boiling point: 161° C., surface tension: 29.3 mN/m)

<5> Surfactants

Surfynol 465: an acetylene-based surfactant manufactured by Air Products and Chemicals, Inc. (HLB value=13)
Surfynol 485: an acetylene-based surfactant manufactured by Air Products and Chemicals, Inc. (HLB value=17)
BYK348: a siloxane-based surfactant manufactured by BYK-Chemie Japan K.K. (HLB value=10)

<6> Preservative

PROXEL GXL: a 1,2-benzisothiazol-3-one solution, manufactured by Arch Chemicals, Inc.

Further, the viscosity values recorded in Table 1 represent values measured at 25° C. using a TVE25L viscometer manufactured by Toki Sangyo Co., Ltd. The pH values represent values measured using a desktop pH meter F-72 manufactured by Horiba, Ltd.

<II> Preparation of Inkjet Inks (1) Production Example for Aqueous Solution of Pigment Dispersing Resin 1

A reaction container fitted with a gas inlet tube, a thermometer, a condenser and a stirrer was charged with 93.4 parts of butanol, and the container was flushed with nitrogen gas. Subsequently, the contents of the reaction container were heated to 110° C., and a mixture containing 20 parts of styrene, 40 parts of acrylic acid and 40 parts of behenyl acrylate as polymerizable monomers and 6 parts of a polymerization initiator V-601 (manufactured by Wako Pure Chemical Industries, Ltd.) was added dropwise to the container over a period of two hours to achieve a polymerization reaction. Following completion of the dropwise addition, reaction was continued at 110° C. for a further three hours, an additional 0.6 parts of V-601 was then added, and the reaction was continued at 110° C. for a further one hour. Following cooling of the reaction system to room temperature, 37.1 parts of dimethylaminoethanol was added, and 100 parts of water was then added to generate an aqueous solution of the polymer product. Subsequently, the aqueous solution was heated to at least 100° C., and the butanol was removed by azeotropic distillation with the water to adjust the solid fraction concentration to 30%, thus obtaining an aqueous solution of a pigment dispersing resin 1. in this description, the term "aqueous solution" describes a solution containing an aqueous medium (a solvent containing water), and components dispersed and/or dissolved in the aqueous medium.

Measurement of the pH of the aqueous solution (solid fraction concentration: 30%) of the above pigment dispersing resin 1 using a desktop pH meter F-72 manufactured by Horiba, Ltd. revealed a pH of 9.7. Further, the weight average molecular weight of the pigment dispersing resin measured using an HLC-8120GPC device manufactured by Tosoh Corporation was 22,500, and the acid value of the pigment dispersing resin 1 measured using an AT-610 device manufactured by Kyoto Electronics Manufacturing Co., Ltd. was 250 mgKOH/g.

(2) Production Examples for Aqueous Solutions of Pigment Dispersing Resins 2 to 7

With the exceptions of altering the types and blend amounts of the polymerizable monomers and the amount of the polymerization initiator added together with the polymerizable monomers as shown below in Table 2, aqueous solutions (each with a solid fraction concentration of 30%) of pigment dispersing resins 2 to 7 were obtained in the same manner as the pigment dispersing resin 1.

TABLE 2

| | | Pigment dispersing resins | | | | | | |
|---|---|---|---|---|---|---|---|---|
| | | 1 | 2 | 3 | 4 | 5 | 6 | 7 |
| Polymerizable monomers | Styrene | 20 | 20 | 30 | 35 | 45 | 20 | 20 |
| | Acrylic acid | 40 | 30 | 16 | 6 | 1 | 50 | 30 |
| | Lauryl methacrylate | | 50 | 44 | 59 | 54 | 30 | 50 |
| | Behenyl acrylate | 40 | | | | | | |
| Polymerization initiator | V-601 | 6 | 6 | 6 | 6 | 6 | 6 | 12 |
| Aqueous solution pH | | 9.7 | 8.1 | 8.5 | 8.8 | 9.2 | 7.4 | 8.1 |
| Acid value (mgKOH/g) | | 250 | 200 | 110 | 40 | 15 | 350 | 200 |
| Weight average average molecular weight | | 22,500 | 15,000 | 13,000 | 11,000 | 15,000 | 28,000 | 8,000 |

Table 2 also shows the pH of the aqueous solution (solid fraction concentration: 30%) of each pigment dispersing resin, the acid value of each pigment dispersing resin, and the weight average molecular weight of each pigment dispersing resin.

(3) Production Example for Pigment Dispersing Resin

A reaction container fitted with a gas inlet tube, a thermometer, a condenser and a stirrer was charged with 45 parts of methyl ethyl ketone, 6.0 parts of acrylic acid, 30.0 parts of methyl methacrylate and 14.0 parts of lauryl methacrylate as polymerizable monomers, 0.15 parts of 2,2'-azobisisobutyronitrile as a polymerization initiator, and 0.65 parts of 2-(dodecylthiocarbonothioylthio)-isobutyric acid. Following flushing of the inside of the reaction container with nitrogen gas, the temperature was raised to 75° C., and a polymerization reaction was conducted for three hours, thus obtaining a copolymer (hydrophilic block) formed from acrylic acid, methyl methacrylate and lauryl methacrylate.

The mixed solution in the reaction container prior to the flushing with nitrogen gas and the mixed solution obtained following the polymerization reaction were analyzed using a gas chromatography-mass spectrometer and compared with the detection peaks attributable to the acrylic acid, methyl methacrylate and lauryl methacrylate used as raw materials. The results revealed that in the mixed solution obtained following the polymerization reaction, almost no peaks attributable to acrylic acid, methyl methacrylate or lauryl methacrylate were observed. Based on these results, it is thought that almost all of the added polymerizable monomers polymerized. Further, the weight average molecular weight of the hydrophilic block measured using an HLC-8120GPC device manufactured by Tosoh Corporation was about 23,000.

Following completion of the above polymerization reaction, the reaction system was cooled to normal temperature, and 45 parts of methyl ethyl ketone, and 10 parts of methyl methacrylate and 40 parts of benzyl methacrylate as polymerizable :monomers were added to the reaction container. Following flushing of the inside of the reaction container with nitrogen gas, the temperature was raised to 75° C., and a polymerization reaction was conducted for three hours, thus obtaining a pigment dispersing resin 8 composed of a block polymer having a copolymer (hydrophobic block) formed from methyl methacrylate and benzyl methacrylate added to the above hydrophilic block.

In the same manner as that described above for the hydrophilic block, a comparison with the detection peaks attributable to the polymerizable monomers was performed using a gas chromatography-mass spectrometer. The results revealed that almost all of the added methyl methacrylate and benzyl methacrylate had polymerized, confirming formation of the hydrophobic block. Further, the weight average molecular weight of the pigment dispersing resin 8 measured using an HLC-8120GPC device manufactured by Tosoh Corporation was about 54,000. Furthermore, the acid value of the pigment dispersing resin 8, measured in the same manner as that described for the pigment dispersing resin 1, was 45 mgKOH/g.

Subsequently, the reaction system was cooled to normal temperature, the mixed solution was then removed from the reaction container, and methyl ethyl ketone was used to adjust the solid fraction concentration to 30%, thus obtaining a methyl ethyl ketone solution of the pigment dispersing resin 8.

(4) Preparation Examples for Cyan Pigment Dispersion

Twenty parts of LIONOL BLUE 7358G (C.I. Pigment Blue 15:3) manufactured by Toyo Color Co., Ltd., 20 parts of the aqueous solution (solid fraction concentration: 30%) of the pigment dispersing resin 1 and 60 parts of water were mixed together and preliminary dispersed using a stirrer. Subsequently, the mixture was subjected to a main dispersion for two hours using a Dyno-Mill with a capacity of 0.6 L filled with 1,800 g of zirconia beads of diameter 0.5 mm, thus obtaining a cyan pigment dispersion.

(5) Preparation Examples for Magenta Pigment Dispersions 1 to 3 and Yellow Pigment Dispersions 4 to 7

With the exceptions of changing the pigment and pigment dispersing resin used as shown in Table 3 below, magenta pigment dispersions 1 to 3 and yellow pigment dispersions 4 to 7 were prepared in the same manner as described above for the preparation example for the cyan pigment dispersion. In the case of the yellow pigment dispersion 7, the methyl ethyl ketone was removed by distillation using an evaporator following completion of the main dispersion, and water was then used to adjust the pigment concentration to 20% by mass.

TABLE 3

| Pigment dispersions | Pigment used | Pigment dispersing resin used |
|---|---|---|
| Magenta pigment dispersion 1 | Toshiki Red 150TR (C.I. Pigment Red 150, manufactured by Tokyo Shikizai Industry Co., Ltd.) | Pigment dispersing resin 2 |
| Magenta pigment dispersion 2 | Novoperm Carmine HF4C (C.I. Pigment Red 185, manufactured by Clariant Japan K.K.) | Pigment dispersing resin 3 |
| Magenta pigment dispersion 3 | FASTOGEN SUPER MAGENTA RG (C.I. Pigment Red 122, manufactured by DIC Corporation) | Pigment dispersing resin 4 |
| Yellow pigment dispersion 4 | Paliotol Yellow D 1155 (C.I. Pigment Yellow 185, manufactured by BASF Corporation) | Pigment dispersing resin 5 |
| Yellow pigment dispersion 5 | Irgazin Yellow D 1999 (C.I. Pigment Yellow 110, manufactured by BASF Corporation) | Pigment dispersing resin 6 |
| Yellow pigment dispersion 6 | Novoperm Yellow P-HG (C.I. Pigment Yellow 180, manufactured by Clariant Japan K.K.) | Pigment dispersing resin 7 |
| Yellow pigment dispersion 7 | FAST YELLOW 7413 (C.I. Pigment Yellow 74, manufactured by Sanyo Color Works, Ltd.) | Pigment dispersing resin 8 |

(6) Production Example for Joncryl 690 Varnish

The materials listed below were mixed together under constant stirring at room temperature for 30 minutes, and the mixture was then heated to 60° C. and stirred for a further three hours. Subsequently, the mixture was cooled to room temperature to obtain a Joncryl 690 varnish.

Joncryl 690 (an acrylic resin manufactured by BASF Corporation, weight average molecular weight: 16,500, acid value: 240 mgKOH/g) 20 parts Ion-exchanged water 80 parts (7) Production Example for Joncryl 819 Varnish With the exception of replacing the Joncryl 690 mentioned above with Joncryl 819 (an acrylic resin manufactured by BASF Corporation, weight average molecular weight: 14,500, acid value: 75 mgKOH/g), a Joncryl 819 varnish (solid fraction concentration: 20%) was obtained in the same manner as the Joncryl 690 production example described above.

(8) Production Example for Cyan Inkjet Ink

The materials listed below were added sequentially to a mixing container under constant stirring with a stirrer, and were mixed thoroughly until a uniform mixture was obtained. Subsequently, a filtration was performed using a membrane filter having a pore size of 1 μm to remove coarse particles that can cause inkjet head blockages, thus obtaining an ink.

Cyan pigment dispersion 20 parts

Joncryl 8211 (an aqueous solution of an acrylic resin emulsion manufactured by BASF Corporation, solid fraction: 44%) 13 parts 1,2-PD: 1,2-propanediol (boiling point: 188° C., surface tension: 35.1 mN/m) 17 parts 1,3-BuD: 1,3-butanediol (boiling point: 207° C., surface tension: 37.1 mN/m) 10 parts Triethanolamine (TEA) 0.5 parts Surfynol 104E (an acetylene-based surfactant manufactured by Air Products and Chemicals, Inc., HLB value=4) 1 part AQUACER 515 (a polyethylene wax emulsion manufactured by BYK-Chemie Japan K.K., solid fraction concentration: 35%, volume average particle size: 35 nm, MFT: 130° C.) 3 parts PROXEL GXL 0.05 parts Ion-exchanged water 35.45 parts (9) Production Examples for Inkjet Inks 1 to 26

With the exception of using the materials shown below in Table 4, the same method as that described for the cyan inkjet ink was used to obtain inkjet inks 1 to 26. The inkjet inks 1 to 3 and 19 to 26 are magenta inks, and the inkjet inks 4 to 18 are yellow inks.

TABLE 4

| | | | Inkjet ink No. | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Blend amount (%) | Pigment dispersions | Magenta | Magenta pigment dispersion 1 | 20 | | | | | | | | | | | | |
| | | | Magenta pigment dispersion 2 | | 20 | | | | | | | | | | | |
| | | | Magenta pigment dispersion 3 | | | 20 | | | | | | | | | | |
| | | Yellow | Yellow pigment dispersion 4 | | | | 20 | | | | 20 | 20 | 20 | 20 | 20 | 20 |
| | | | Yellow pigment dispersion 5 | | | | | 20 | | | | | | | | |
| | | | Yellow pigment dispersion 6 | | | | | | 20 | | | | | | | |
| | | | Yellow pigment dispersion 7 | | | | | | | 20 | | | | | | |
| | Binder resin | | Joncryl 8211 (solid Fraction: 44%) | 13 | 13 | 13 | 13 | 13 | 13 | 13 | 13 | 13 | 13 | 13 | 13 | 13 |
| | Water-soluble organic solvents | | DEMEE | | | | | | | | | | 17 | | | |
| | | | 1,2-PD (boiling point: 196° C.) | 17 | 17 | 17 | 17 | 17 | 17 | 17 | 17 | | | 3.5 | | |
| | | | 1,3-BuD (boiling point: 188° C.) | 10 | 10 | 10 | 10 | 10 | 10 | 10 | | 17 | | | | |
| | | | 1,2-HexD (boiling point: 207° C.) | | | | | | | | | | | 13.5 | | |
| | | | DEG (boiling point: 224° C.) | | | | | | | | | | | | 7.5 | 10 |
| | pH adjusters | | TEA (boiling point: 244° C.) | | | | | | | | | | | | | |
| | | | AMP | 0.5 | 0.5 | 0.5 | 0.5 | 0.5 | 0.5 | 0.5 | 0.5 | 0.5 | 0.5 | 0.5 | 0.5 | 0.5 |
| | Surfactants | Acetylene based | Surfynol 465 | 1 | 1 | 1 | 1 | 1 | 1 | 1 | 1 | 1 | 1 | 1 | 1 | 1 |
| | | | Surfynol 104E | 3 | 3 | 3 | 3 | 3 | 3 | 3 | 3 | 3 | 3 | 3 | 3 | 3 |
| | | Wax | AQUACER 515 (solid fraction: 35%) | | | | | | | | | | | | | |
| | Preservative | | PROXEL GXL | 0.05 | 0.05 | 0.05 | 0.05 | 0.05 | 0.05 | 0.05 | 0.05 | 0.05 | 0.05 | 0.05 | 0.05 | 0.05 |
| | Water | | | 35.45 | 35.45 | 35.45 | 35.45 | 35.45 | 35.45 | 35.45 | 45.45 | 45.45 | 45.45 | 45.45 | 54.95 | 52.45 |
| | Total | | | 100 | 100 | 100 | 100 | 100 | 100 | 100 | 100 | 100 | 100 | 100 | 100 | 100 |
| Specifications | Inkjet ink viscosity | | | 8.5 | 8.2 | 8.0 | 7.9 | 8.3 | 8.8 | 7.5 | 7.5 | 7.4 | 7.5 | 8.0 | 7.8 | 8.3 |
| | Total amount of water-soluble organic solvent (%) | | | 27.0 | 27.0 | 27.0 | 27.0 | 27.0 | 27.0 | 27.0 | 17.0 | 17.0 | 17.0 | 17.0 | 7.5 | 10.0 |
| | Amount of organic solvent having boiling point of 240° C. or higher (%) | | | 0.0 | 0.0 | 0.0 | 0.0 | 0.0 | 0.0 | 0.0 | 0.0 | 0.0 | 0.0 | 0.0 | 7.5 | 10.0 |
| | Inkjet ink solid fraction (%) | | | 11.97 | 11.97 | 11.97 | 11.97 | 11.97 | 11.97 | 11.97 | 11.97 | 11.97 | 11.97 | 11.97 | 11.97 | 11.97 |
| | Resin content relative to solid fraction (%) | | | 57.8% | 57.8% | 57.8% | 57.8% | 57.8% | 57.8% | 57.8% | 57.8% | 57.8% | 57.8% | 57.8% | 57.8% | 57.8% |

TABLE 4-continued

| Blend amount (%) | | | | 14 | 15 | 16 | 17 | 18 | 19 | 20 | 21 | 22 | 23 | 24 | 25 | 26 |
|---|---|---|---|---|---|---|---|---|---|---|---|---|---|---|---|---|
| Pigment dispersions | Magenta | | Magenta pigment dispersion 1 | 20 | 20 | 20 | 20 | 20 | 20 | 20 | 20 | 20 | 20 | 20 | 20 | 20 |
| | Yellow | | Yellow pigment dispersion 4 | 13 | 13 | | | | | | | | | | | |
| | | | Joncryl 8211 | | | | | | | 13 | | | | 13 | 13 | 13 |
| Binder resin | | | (solid Fraction: 44%) | | | | | | | | | | | | | |
| | | | AW-36H | | | 22.9 | | | | | | | | | | |
| | | | (solid fraction: 25%) | | | | | | | | | | | | | |
| | | | Joncryl 819 varnish | | | | 28.6 | | | | | | | | | |
| | | | (solid fraction: 20%) | | | | | | | | | | | | | |
| | | | Joncryl 690 varnish | | | | | 28.6 | | | | | | | | |
| | | | (solid fraction: 20%) | | | | | | | | | | | | | |
| Water-soluble organic solvents | | | DEMEE (boiling point: 196° C.) | 7 | 3.5 | 3.5 | 3.5 | 3.5 | | | | | | | | |
| | | | 1,2-PD (boiling point: 188° C.) | | 5.5 | 5.5 | 5.5 | 5.5 | 17 | 17 | 17 | 17 | 17 | 17 | 17 | 17 |
| | | | 1,3-BuD (boiling point: 207° C.) | | | | | | 10 | 10 | 10 | 10 | 10 | 10 | 10 | 10 |
| | | | Glycerol (boiling point: 290° C.) | 10 | 8 | 8 | 8 | 8 | | | | | | | | |
| pH adjusters | | | TEA | 0.5 | 0.5 | 0.5 | 0.5 | 0.5 | 0.5 | 0.5 | 0.5 | 0.5 | 0.5 | 0.5 | 0.5 | 0.5 |
| | | | AMP | | | | | | | | | | | | | |
| Surfactants | Acetylene based | | Surfynol 465 | 1 | 1 | 1 | 1 | 1 | 1 | 1 | 1 | 1 | 1 | 1 | 1 | 1 |
| | | | Surfynol 104E | | | | | | | | | | | | | |
| | Siloxane based | | BYK348 | | | | | | 3 | | | | | | | |
| Wax | | | AQUACER 515 (solid fraction: 35%) | 3 | 3 | 3 | 3 | 3 | | | 1 | 6 | | | 3 | 3 |
| | | | AQUACER 593 (solid fraction: 30%) | | | | | | | | | | 3 | | | |
| Preservative | | | PROXEL GXL | 0.05 | 0.05 | 0.05 | 0.05 | 0.05 | 0.05 | 0.05 | 0.05 | 0.05 | 0.05 | 0.05 | 0.05 | 0.05 |
| | | | Water | 45.45 | 45.45 | 35.55 | 29.85 | 29.85 | 48.45 | 38.45 | 51.45 | 37.45 | 32.45 | 35.45 | 35.45 | 35.45 |
| | | | Total | 100 | 100 | 100 | 100 | 100 | 100 | 100 | 100 | 100 | 100 | 100 | 100 | 100 |

Table 4 also details the solid fraction of each inkjet ink and the resin content relative to that solid fraction. Of the materials included in Table 4, details regarding the abbreviations and the materials not shown in Table 1 or used above are as follows.

<1> Binder Resin

AW-36H: an acrylic resin varnish manufactured by Seiko PMC Corporation, weight average molecular weight: 14,000, acid value: 60 mgKOH/g, solid fraction concentration: 25%

<2> Water-Soluble Organic Solvent

DEMEE: diethylene glycol monoethyl ether (boiling point: 196° C.)

<3> Wax

AQUACER 593: a polypropylene wax emulsion manufactured by BYK-Chemie Japan K.K., concentration: 30%, volume average particle size: 20 nm, MFT: 160° C.

Further, the ink viscosity values recorded in Table 4 represent values measured at 25° C. using a TVE25L viscometer manufactured by Toki Sangyo Co., Ltd.

<III> Evaluations of Treatment Liquids and Inkjet Inks (1) Production Example for Recording Medium 1 with Applied Treatment Liquid Using a print tester Flexiproof 100 (manufactured by Matsuo Sangyo Co., Ltd.), the treatment liquid 1 produced in the manner described above was coated uniformly onto NPi high-quality paper, the mass of which had been measured in advance (W0). The NPI high-quality paper (referred to as "recording medium A" in the subsequent description and Tables 5 and 6) was manufactured by Nippon Paper Industries Co., Ltd., and had a grammage of 64 $g/m^2$ and a pure water absorption (100 msec) of 10 $g/m^2$. The coating was performed at 80 m/min using a ceramic roller having 140 ridges/inch, so as to achieve a coating film thickness of the treatment liquid 1 of 3.0±0.3 μm.

Following application of the treatment liquid 1, the mass of the recording medium A was measured (W1), and the recording medium was then placed on a digital hot plate (manufactured by AS ONE Corporation) with the plate temperature set to 35° C., and left to stand on the hot plate until the dryness ratio represented by formula (2) shown below reached 5±2%, thus completing production of a recording medium 1 with an applied treatment liquid.

Dryness ratio (% by mass)=100×{(W1−W2)/(W1−W0)}

In formula (2), W2 represents the mass of the recording medium after standing on the hot plate.

(2) Production Examples for Recording Media 2 to 22 and 30 to 44 with Applied Treatment Liquids With the exceptions of using the treatment liquids shown in Table 5, and adjusting the dryness ratio to the values shown in Table 5. a recording media 2 to 22 and 30 to 44 each with an applied treatment liquid were produced in the same manner as the recording medium 1 with an applied. treatment liquid.

(3) Production Examples for Recording Media 23 and 24 with Applied Treatment Liquids With the exceptions of using the treatment liquid 3 produced above, using a ceramic roller having 1,000 and 500 ridges/inch respectively in the print tester Flexiproof 100, and performing the coaling so as to achieve a coating film thickness of the treatment liquid 3 of 0.3±0.1 μm and 0.5±0.1 μm respectively, a recording media 23 and 24 each with an applied treatment liquid were produced in the same manner as the recording medium 1 with an applied treatment liquid.

(4) Production Examples for Recording Media 25 and 26 with Applied Treatment Liquids Instead of the Flexiproof 100 described above, a Control Coater K202 (manufactured by Matsuo Sangyo Co., Ltd.) and a wire bare No. 1 or No. 2 were used. Other than these exceptions, recording media 25 and 26 each having an applied treatment liquid, and with a total wet coating film thickness of about 6 μm and about 12 μm respectively, were produced in the same manner as the recording medium 1 with an applied treatment liquid.

(5) Production Examples for Recording Media 27 to 29 with Applied Treatment Liquids With the exception of using the recording media described below, recording media 27 to 29 each having an applied treatment liquid were produced in the same manner as the recording medium 3 with an applied treatment liquid.

OK Topcoat+paper: manufactured by Oji Paper Co., Ltd., pure water absorption (100 msec): 4.5 $g/m^2$, referred to as "recording medium B" in Table 5.

Multicolor Foam Gloss paper: manufactured by Oji Paper Co., Ltd., grammage: 104.7 $g/m^2$, pure water absorption (100 msec): 5.5 $g/m^2$, referred to as "recording medium C" in Table 5.

Xerox Premium Multipurpose 4024 paper: manufactured by Xerox Holdings Corporation, pure water absorption (100 msec): 15 $g/m^2$, referred to as "recording medium D" in Table 5.

TABLE 5

| Example/Comparative Example | Used treatment liquid No. | Used recording medium type | Pure water absorption (100 msec, g/m²) | Coating film thickness (μm) | Dryness ratio | Inkjet ink | Dot circularity | Coverage | Drying properties | Image uniformity | Image density (OD) | Dot circularity (upon aging) | Water resistance | Abrasion resistance |
|---|---|---|---|---|---|---|---|---|---|---|---|---|---|---|
| Example 1 | 1 | A | 10 | 3 | 5% | 1 | 2 | 2 | 4 | 4 | 4 | 2 | 4 | 4 |
| Example 2 | 2 | A | 10 | 3 | 5% | 1 | 4 | 4 | 4 | 4 | 4 | 4 | 4 | 4 |
| Example 3 | 3 | A | 10 | 3 | 5% | 1 | 4 | 4 | 4 | 4 | 4 | 4 | 4 | 4 |
| Example 4 | 4 | A | 10 | 3 | 5% | 1 | 2 | 2 | 4 | 4 | 4 | 2 | 4 | 4 |
| Example 5 | 5 | A | 10 | 3 | 5% | 1 | 4 | 4 | 4 | 4 | 4 | 4 | 4 | 4 |
| Example 6 | 6 | A | 10 | 3 | 5% | 1 | 4 | 4 | 4 | 4 | 4 | 4 | 4 | 4 |
| Example 7 | 7 | A | 10 | 3 | 5% | 1 | 4 | 4 | 2 | 2 | 4 | 4 | 4 | 4 |
| Example 8 | 8 | A | 10 | 3 | 5% | 1 | 4 | 4 | 4 | 4 | 4 | 4 | 4 | 4 |
| Example 9 | 9 | A | 10 | 3 | 5% | 1 | 4 | 4 | 4 | 4 | 4 | 2 | 4 | 4 |
| Example 10 | 10 | A | 10 | 3 | 5% | 1 | 4 | 4 | 4 | 4 | 4 | 4 | 4 | 4 |
| Example 11 | 11 | A | 10 | 3 | 5% | 1 | 2 | 2 | 4 | 4 | 4 | 2 | 4 | 4 |
| Example 12 | 12 | A | 10 | 3 | 5% | 1 | 4 | 4 | 4 | 4 | 4 | 2 | 4 | 4 |
| Example 13 | 13 | A | 10 | 3 | 5% | 1 | 4 | 4 | 4 | 4 | 4 | 2 | 4 | 4 |
| Example 14 | 14 | A | 10 | 3 | 5% | 1 | 4 | 4 | 4 | 4 | 4 | 2 | 4 | 4 |
| Example 15 | 15 | A | 10 | 3 | 5% | 1 | 4 | 4 | 4 | 4 | 4 | 4 | 4 | 4 |
| Example 16 | 16 | A | 10 | 3 | 5% | 1 | 4 | 4 | 4 | 4 | 4 | 4 | 4 | 4 |
| Example 17 | 17 | A | 10 | 3 | 5% | 1 | 4 | 4 | 4 | 4 | 4 | 4 | 4 | 4 |
| Example 18 | 18 | A | 10 | 3 | 5% | 1 | 4 | 4 | 4 | 4 | 4 | 4 | 4 | 4 |
| Example 19 | 19 | A | 10 | 3 | 5% | 1 | 4 | 4 | 4 | 4 | 4 | 4 | 4 | 4 |
| Example 20 | 20 | A | 10 | 3 | 5% | 1 | 4 | 4 | 4 | 4 | 4 | 4 | 4 | 4 |
| Example 21 | 21 | A | 10 | 3 | 5% | 1 | 4 | 4 | 4 | 4 | 4 | 4 | 4 | 4 |
| Example 22 | 22 | A | 10 | 3 | 5% | 1 | 3 | 3 | 4 | 3 | 4 | 3 | 4 | 4 |
| Example 23 | 3 | A | 10 | 0.3 | 5% | 1 | 4 | 4 | 4 | 4 | 4 | 4 | 4 | 4 |
| Example 24 | 3 | A | 10 | 0.5 | 5% | 1 | 4 | 4 | 4 | 4 | 4 | 4 | 4 | 4 |
| Example 25 | 3 | A | 10 | 6 | 5% | 1 | 4 | 4 | 2 | 2 | 4 | 4 | 4 | 4 |
| Example 26 | 3 | A | 10 | 12 | 5% | 1 | 4 | 4 | 2 | 3 | 4 | 4 | 4 | 4 |
| Example 27 | 3 | B | 4.5 | 3 | 5% | 1 | 3 | 3 | 2 | 4 | 4 | 3 | 2 | 4 |
| Example 28 | 3 | C | 5.5 | 3 | 5% | 1 | 3 | 3 | 3 | 4 | 4 | 3 | 2 | 4 |
| Example 29 | 3 | D | 15 | 3 | 5% | 1 | 4 | 2 | 4 | 4 | 4 | 2 | 4 | 4 |
| Example 30 | 3 | A | 10 | 3 | 10% | 1 | 4 | 3 | 4 | 4 | 4 | 4 | 4 | 4 |
| Example 31 | 3 | A | 10 | 3 | 15% | 1 | 4 | 2 | 4 | 4 | 3 | 4 | 4 | 4 |
| Example 32 | 3 | A | 10 | 3 | 75% | 1 | 2 | 2 | 4 | 4 | 2 | 2 | 4 | 4 |
| Example 33 | 3 | A | 10 | 3 | 5% | 2 | 4 | 4 | 4 | 4 | 4 | 4 | 4 | 4 |
| Example 34 | 3 | A | 10 | 3 | 5% | 3 | 4 | 4 | 4 | 4 | 4 | 4 | 4 | 4 |
| Example 35 | 3 | A | 10 | 3 | 5% | 4 | 4 | 4 | 4 | 4 | 4 | 4 | 4 | 4 |
| Example 36 | 3 | A | 10 | 3 | 5% | 5 | 4 | 4 | 4 | 4 | 3 | 3 | 4 | 4 |
| Example 37 | 3 | A | 10 | 3 | 5% | 6 | 4 | 4 | 4 | 4 | 4 | 4 | 4 | 4 |
| Example 38 | 3 | A | 10 | 3 | 5% | 7 | 4 | 4 | 4 | 4 | 4 | 4 | 4 | 4 |

TABLE 5-continued

| Example/ Comparative Example | No. | Recording medium with applied treatment liquid | | | | | | | Evaluation results | | | | | | | |
|---|---|---|---|---|---|---|---|---|---|---|---|---|---|---|---|---|
| | | Used treatment liquid No. | Used recording medium | | | | | | Printing quality (initial) | | | | | Printing quality (upon aging) | Coating film quality | |
| | | | type | Pure water absorption (100 msec, g/m2) | Coating film thickness (μm) | Dryness ratio | Inkjet ink | Dot circularity | Coverage | Drying properties | Image uniformity | Image density (OD) | Dot circularity | Water resistance | Abrasion resistance |
| Example 39 | 3 | 3 | A | 10 | 3 | 5% | 8 | 4 | 4 | 4 | 4 | 4 | 4 | 4 | 4 |
| Example 40 | 3 | 3 | A | 10 | 3 | 5% | 9 | 4 | 4 | 4 | 4 | 4 | 4 | 4 | 4 |
| Example 41 | 3 | 3 | A | 10 | 3 | 5% | 10 | 4 | 4 | 4 | 4 | 4 | 4 | 4 | 4 |
| Example 42 | 3 | 3 | A | 10 | 3 | 5% | 11 | 4 | 4 | 4 | 4 | 4 | 4 | 4 | 4 |
| Example 43 | 3 | 3 | A | 10 | 3 | 5% | 12 | 4 | 4 | 3 | 4 | 4 | 2 | 4 | 4 |
| Example 44 | 3 | 3 | A | 10 | 3 | 5% | 13 | 4 | 4 | 2 | 4 | 4 | 4 | 4 | 4 |
| Example 45 | 3 | 3 | A | 10 | 3 | 5% | 14 | 4 | 4 | 4 | 4 | 4 | 4 | 4 | 4 |
| Example 46 | 3 | 3 | A | 10 | 3 | 5% | 15 | 4 | 4 | 4 | 4 | 4 | 4 | 4 | 4 |
| Example 47 | 3 | 3 | A | 10 | 3 | 5% | 16 | 4 | 4 | 4 | 4 | 4 | 3 | 4 | 4 |
| Example 48 | 3 | 3 | A | 10 | 3 | 5% | 17 | 4 | 4 | 4 | 4 | 4 | 3 | 4 | 4 |
| Example 49 | 3 | 3 | A | 10 | 3 | 5% | 18 | 3 | 4 | 4 | 4 | 4 | 4 | 4 | 4 |
| Example 50 | 3 | 3 | A | 10 | 3 | 5% | 19 | 4 | 4 | 4 | 4 | 4 | 4 | 4 | 4 |
| Example 51 | 3 | 3 | A | 10 | 3 | 5% | 20 | 4 | 4 | 4 | 4 | 4 | 4 | 2 | 2 |
| Example 52 | 3 | 3 | A | 10 | 3 | 5% | 21 | 4 | 4 | 4 | 4 | 4 | 4 | 2 | 2 |
| Example 53 | 3 | 3 | A | 10 | 3 | 5% | 22 | 4 | 4 | 4 | 4 | 4 | 4 | 4 | 3 |
| Example 54 | 3 | 3 | A | 10 | 3 | 5% | 23 | 4 | 4 | 4 | 4 | 4 | 4 | 4 | 4 |
| Example 55 | 3 | 3 | A | 10 | 3 | 5% | 24 | 4 | 4 | 4 | 4 | 4 | 4 | 4 | 4 |
| Example 56 | 3 | 3 | A | 10 | 3 | 5% | 25 | 4 | 3 | 4 | 4 | 4 | 4 | 4 | 4 |
| Example 57 | 3 | 3 | A | 10 | 3 | 5% | 26 | 4 | 3 | 4 | 4 | 4 | 4 | 4 | 4 |
| Com. Example 1 | 33 | 23 | A | 10 | 3 | 5% | 1 | 1 | 1 | 4 | 2 | 4 | 1 | 4 | 4 |
| Com. Example 2 | 34 | 24 | A | 10 | 3 | 5% | 1 | 1 | 1 | 4 | 2 | 4 | 1 | 4 | 4 |
| Com. Example 3 | 35 | 25 | A | 10 | 3 | 5% | 1 | 4 | 4 | 1 | 4 | 4 | 4 | 4 | 4 |
| Com. Example 4 | 36 | 26 | A | 10 | 3 | 5% | 1 | 4 | 4 | 1 | 4 | 4 | 4 | 4 | 4 |
| Com. Example 5 | 37 | 27 | A | 10 | 3 | 5% | 1 | 1 | 4 | 4 | 4 | 4 | 1 | 4 | 4 |
| Com. Example 6 | 38 | 28 | A | 10 | 3 | 5% | 1 | 4 | 4 | 4 | 4 | 4 | 4 | 4 | 4 |
| Com. Example 7 | 39 | 29 | A | 10 | 3 | 5% | 1 | 1 | 4 | 4 | 1 | 4 | 1 | 4 | 4 |
| Com. Example 8 | 40 | 30 | A | 10 | 3 | 5% | 1 | 4 | 4 | 4 | 1 | 4 | 4 | 4 | 4 |
| Com. Example 9 | 41 | 31 | A | 10 | 3 | 5% | 1 | 1 | 1 | 4 | 1 | 4 | 1 | 4 | 4 |
| Com. Example 10 | 42 | 32 | A | 10 | 3 | 5% | 1 | 1 | 3 | 1 | 1 | 4 | 2 | 4 | 4 |
| Com. Example 11 | 43 | 33 | A | 10 | 3 | 5% | 1 | 4 | 1 | 4 | 1 | 4 | 4 | 4 | 4 |
| Com. Example 12 | 44 | 34 | A | 10 | 3 | 5% | 1 | 1 | 2 | 1 | 1 | 4 | 1 | 4 | 4 |

<Preparation of Inkjet Ink Set Printing Apparatus>

Two inkjet heads KJ4B-1200 (manufactured by Kyocera Corporation) were installed above a conveyor capable of transporting a recording medium, and the cyan inkjet ink prepared above and one of the inkjet inks 1 to 26 shown in Table 4 were used to fill these heads in sequence from the upstream side. The design resolution of these inkjet heads was 1,200 dpi, the maximum drive frequency was 64 kHz. The recording resolution in the recording medium transport direction during printing at the maximum drive frequency and a printing speed of 80 m/min was 1,200 dpi.

<Printing of Gradation Printed Matter>

Each of the recording media with an applied treatment liquid produced in the manner described above was secured to the conveyor of the aforementioned inkjet ink set printing apparatus, and the conveyor was driven at a fixed speed listed below. As the recording medium with the applied treatment liquid passed beneath the installed location of the inkjet heads, the cyan ink and then the inkjet ink (magenta or yellow) listed in Table 4 were jetted sequentially onto the recording medium using a drop volume of 3 pL, thereby printing a gradation image illustrated in FIG. 1. Within 10 seconds of the completion of printing, the printed matter was fed into a 50° C. air oven and dried for three minutes, thus obtaining a gradation printed item. In the dot circularity evaluation described below, three types of gradation printed items were used, printed with the conveyor speed set to 50 m/min, 75 m/min and 100 m/min respectively. Further, in the image uniformity evaluation, the gradation printed item printed at a conveyor speed of 75 m/min was used.

<Printing of Solid Printed Matter>

Each of the recording media with an applied treatment liquid produced in the manner described above was secured to the conveyor of the aforementioned inkjet ink set printing apparatus, and the conveyor was driven at a fixed speed listed below. As the recording medium with the applied treatment liquid passed beneath the installed location of the inkjet heads, only the inkjet ink (magenta or yellow) listed in Table 4 was jetted onto the recording medium using a drop volume of 3 pL to print a solid image (15 cm×15 cm) with a print ratio of 100%. Within 10 seconds of the completion of printing, the printed matter was fed into a 50° C. air oven and dried for a specified time, thus producing a solid printed item. In the coverage evaluation described below, three types of solid printed items were used, printed with the conveyor speed set to 50 m/min, 75 m/min and 100 m/min respectively, and the drying time in the 50° C. air oven set to 3 minutes. Further, in the drying properties evaluation, the solid printed item printed at a conveyor speed of 75 m/min was used. Moreover, in the image density (GD) evaluation, the water resistance evaluation and the abrasion resistance evaluation, the solid printed item printed at a conveyor speed of 75 m/min, with the drying time in the 50° C. air oven set to 3 minutes, was used.

The combinations of recording media and inkjet inks evaluated above are as shown above in Table 5.

Examples 1 to 57, Comparative Examples 1 to 12

The gradation printed matter and solid printed matter produced in the manner described above were subjected to the following evaluations. The evaluation results were as shown above in Table 5.

<Evaluation of Dot Circularity (Initial)>

Using an optical microscope, each of the printed portions (2a, 2b, 2c, 2d and 2e in FIG. 1) of the above gradation printed matter was inspected at a magnification of 200× at a position 1 cm to the right of, and 1 cm below, the top left corner of the printed portion. Then, an evaluation of the dot circularity was performed based on the existence or absence of deformation in 10 randomly selected dots of the inkjet ink shown in Table 4 (magenta or yellow). The evaluation criteria were as described below. Evaluation results of "4", "3" and "2" were deemed to indicate favorable dot circularity.

The degree of circularity was used as the basis for judging deformation of the dots. Specifically, the outline of each dot was sandwiched between two concentric circles that yielded the smallest difference in radius (an inscribed circle and a circumscribed circle), and the ratio between the radius of the inscribed circle and the radius of the circumscribed circle, namely "radius of inscribed circle of dot/radius of circumscribed circle of dot", was calculated as the degree of circularity. Then, if the degrees of circularity of the 10 dots were all within a range from 0.67 to 1.5, the dots were adjudged to "have no deformation", otherwise the dots were adjudged to "have deformation".

Further, all 5 printed portions were inspected for each of the gradation printed items produced at the various conveyor speeds, and even if one printed portion was adjudged to "have deformation", the printed matter produced at that conveyor speed was deemed to "have deformation".

(Evaluation Criteria)

4: at all three printing speeds, no dot deformation was observed.

3: at 50 m/min and 75 m/min, no dot deformation was observed, but at 100 m/min, dot deformation was observed.

2: at 50 m/min, no dot deformation was observed, but at 75 m/min and 100 m/min, dot deformation was observed.

1: at all three printing speeds, dot deformation was observed.

<Evaluation of Coverage>

Using an optical microscope, the solid printed matter described above was inspected at a magnification of 200×, and the coverage was evaluated by confirming the presence or absence of voids and bands. A coverage evaluation was conducted for each of the solid printed items produced at the various conveyor speeds. The evaluation criteria were as follows. Evaluation results of "4", "3" and "2" were deemed to indicate favorable coverage.

(Evaluation Criteria)

4: at all three printing speeds, no voids or bands were observed.

3: at 50 m/min and 75 m/min, no voids or bands were observed, but at 100 m/min, voids and/or bands were observed.

2: at 50 m/min, no voids or bands were observed, but at 75 m/min and 100 m/min, voids and/or bands were observed.

1: at all three printing speeds, voids and/or bands were observed.

<Evaluation of Drying Properties>

The solid printed item printed at a conveyor speed of 75 m/min was placed in a 50° C. air oven immediately following printing, and the drying properties were evaluated by removing the printed item at 30-second intervals and touching the printed item with a finger. The evaluation criteria were as follows. Evaluation results of "4", "3" and "2" were deemed to indicate favorable drying properties.

(Evaluation Criteria)

4: even when touched with a finger after 30 seconds in the oven, no ink adhered to the finger.

3: ink adhered to the finger when touched after 30 seconds in the oven, but no ink adhered after one minute in the oven.

2: ink adhered to the finger when touched after one minute in the oven, but no ink adhered after one minute and 30 seconds in the oven.

1: ink adhered to the finger even when touched after one minute and 30 seconds in the oven.

<Evaluation of Image Uniformity>

Using the printed portion of the gradation printed item printed at a conveyor speed of 75 m/min with a total print ratio of 120% (portion 2a in FIG. 1), the degree of circularity of 20 randomly selected dots in a portion 1 cm to the right of, and 1 cm below, the top left corner of the printed portion was calculated using the same method as that described for the evaluation of the dot circularity. Further, the average value for the 20 obtained degree of circularity values was also determined.

Furthermore, the average degree of circularity was also calculated for a portion 1 cm to the left of, and 1 cm below, the top right corner of the printed portion, a portion 1 cm to the left of, and 1 cm above, the bottom right corner of the printed portion, and a portion 1 cm to the right of, and 1 cm above, the bottom left corner of the printed portion. An evaluation of the image uniformity was then conducted by comparing the degree of circularity average values obtained for the four portions. The evaluation criteria were as follows. Evaluation results of "4", "3" and "2" were deemed to indicate favorable image uniformity.

(Evaluation Criteria)

4: the ratio of the difference between the maximum average value and the minimum average value for the degree of circularity among the four locations, relative to the maximum average value, was 3% or less.

3: the ratio of the difference between the maximum average value and the minimum average value for the degree of circularity among the four locations, relative to the maximum average value, was greater than 3% but not more than 10%.

2: the ratio of the difference between the maximum average value and the minimum average value for the degree of circularity among the four locations, relative to the maximum average value, was greater than 10% but not more than 20%.

1: the ratio of the difference between the maximum average value and the minimum average value for the degree of circularity among the four locations, relative to the maximum average value, was greater than 20%.

<Evaluation of Image Density (OD)>

Using an X-Rite eXact manufactured by Videojet X-Rite K.K., the image density at 5 randomly selected locations of the solid printed matter printed at a conveyor speed of 75 m/min was measured under conditions including a D50 light source, a viewing angle of 2°, the CIE color system, and a T filter. The image density was then evaluated by calculating the average value of the obtained image density values. The evaluation criteria were as follows. Evaluation results of "4", "3" and "2" were deemed to indicate favorable image density.

(Evaluation Criteria)

4: the OD for the magenta ink was at least 1.5, and the OD for the yellow ink was at least 1.0.

3: the OD for the magenta ink was at least 1.1 but less than 1.5, and the OD for the yellow ink was at least 0.8 but less than 1.0.

2: the OD for the magenta ink was at least 0.7 but less than 1.1, and the OD for the yellow ink was at least 0.6 but less than 0.8.

1: the OD for the magenta ink was less than 0.7, and the OD for the yellow ink was less than 0.6.

<Evaluation of Water Resistance>

The solid printed item printed at a conveyor speed of 75 m/min was rubbed a prescribed number of times with a cotton swab that had been wet with water, and the water resistance was evaluated by confirming visually whether or not the printed matter was removed to expose the recording medium. The evaluation criteria were as follows. Evaluation results of "4", "3" and "2" were deemed to indicate practically usable levels.

(Evaluation Criteria)

4: even after 10 back and forth rubbing repetitions, the printed matter was not removed and the recording medium was not exposed.

3: after 10 back and forth rubbing repetitions, the printed matter was removed and the recording medium was exposed, but after 6 back and forth repetitions, the recording medium was not exposed.

2: after 6 back and forth rubbing repetitions, the printed matter was removed and the recording medium was exposed, but after 3 back and forth repetitions, the recording medium was not exposed.

1: even after 3 back and forth rubbing repetitions, the printed matter was removed and the recording medium was exposed.

<Evaluation of Abrasion Resistance>

The solid printed item printed at a conveyor speed of 75 m/min was installed in a Sutherland Rub Tester (manufactured by Toyo Seiki Seisaku-sho, Ltd.) fitted with a rubbing target paper (NPI-70, manufactured by Nippon Paper Industries Co., Ltd.), 4 pounds of weight was applied, and following a prescribed number of back and forth rubbing repetitions, the abrasion resistance was evaluated by confirming visually whether or not the printed matter had been removed to expose the recording medium. The evaluation criteria were as follows. Evaluation results of "4", "3" and "2" were deemed to indicate practically usable levels.

4: even after 20 back and forth rubbing repetitions, the printed matter was not removed and the recording medium was not exposed.

3: after 20 back and forth rubbing repetitions, the printed matter was removed and the recording medium was exposed, but after 15 back and forth repetitions, the recording medium was not exposed.

2: after 15 back and forth rubbing repetitions, the printed matter was removed and the recording medium was exposed, but after 10 back and forth repetitions, the recording medium was not exposed.

1: even after 10 back and forth rubbing repetitions, the printed matter was removed and the recording medium was exposed.

<Evaluation of Dot Circularity (Upon Aging)>

Ten kg of each of the treatment liquids 1 to 34 was placed in a can, and with the can unsealed in an open state, the can was left to stand for one week at room temperature. Subsequently, the solid fraction concentration of each treatment liquid was measured, and if the measured value was greater than the initial value, then water was added to adjust the solid fraction concentration to the same as that prior to standing, thus completing preparation of aged treatment liquids 1 to 34.

With the exception of using these aged treatment liquids 11 to 34, the same methods as those described above were used to produce recording media with applied treatment liquids and gradation printed matter.

Using the thus obtained gradation printed matter, the same method and evaluation criteria as those described above for the evaluation of the dot circularity were used to evaluate the dot circularity upon aging.

The results of the above evaluations confirmed that when an ink set according to an embodiment of the present invention was used (and particularly when the ink set was used on a recording medium having specific water absorption properties), printed matter of high image quality having excellent dot circularity, image uniformity and image density, with no image defects such as color mixing and inadequate coverage, could be obtained.

On the other hand, of the treatment liquids listed in Table 1, the treatment liquids 23 and 31 in which the calcium nitrate content was less than 21.5% by mass, the treatment liquid 24 in which the calcium nitrate content was greater than 41.7% by mass, and the treatment liquid 32 which used a coagulant other than calcium nitrate, a deterioration in the dot shape and inadequate coverage were confirmed. In the treatment liquids 23 and 31, it is thought that the aggregation action deteriorate because the calcium nitrate content was too low. In the case of the treatment liquid 24, it is thought that the aggregation action was excessive as a result of the calcium nitrate content being too high, causing the aggregation reaction to proceed to completion immediately following impact on the recording medium. Further, the results for the treatment liquid 32 confirmed that the effects achieved with the embodiments of the present invention did not manifest satisfactorily with a treatment liquid that did not contain calcium nitrate.

In the case of the treatment liquids 27 and 28 which had pH values outside the specified range from 3.5 to 10.5, the dot circularity was found to be inferior, whereas for the treatment liquids 29 and 30 which had viscosities outside the specified range from 5.5 to 18.5 mPa·s, the image uniformity was found to be inferior. These results confirmed that in order to ensure favorable manifestation of the effects of the embodiments of the present invention, and obtain printed matter having particularly superior image quality, simply adjusting the amounts of calcium nitrate and high-boiling point solvents was insufficient, and control of the treatment liquid pH and viscosity was also necessary.

The treatment liquid 33 is a reproduction of a treatment liquid disclosed in Comparative Example 1 of the Patent Document 3 (JP 2011-56884 A), and the treatment liquid 34 is a reproduction of a treatment liquid 2 disclosed in the Patent Document 4 (JP 2010-65170 A). Both of these treatment liquids have a calcium nitrate content that falls within the range specified in embodiments of the present invention. However, the amount of high-boiling point solvents exceeds 8% by mass, and the treatment liquids include no pH adjuster, and not only were the drying properties inferior, but a deterioration in the dot circularity upon aging was also confirmed.

DESCRIPTION OF THE REFERENCE SIGNS

1: Recording medium with applied treatment liquid
2a: Printed portion with total print ratio of 120% (cyan inkjet ink print ratio: 60%, magenta ink or yellow ink print ratio: 60%)
2b: Printed portion with total print ratio of 100% (cyan inkjet ink print ratio: 50%, magenta ink or yellow ink print ratio: 50%)
2c: Printed portion with total print ratio of 80% (cyan inkjet ink print ratio: 40%, magenta ink or yellow ink print ratio: 40%)
2d: Printed portion with total print ratio of 60% (cyan inkjet ink print ratio: 30%, magenta ink or yellow ink print ratio: 30%)
2e: Printed portion with total print ratio of 40% (cyan inkjet ink print ratio: 20%, magenta ink or yellow ink print ratio: 20%)

The invention claimed is:

1. An ink set comprising an inkjet ink, and a treatment liquid used in combination with the inkjet ink, wherein
the inkjet ink comprises a pigment, a water-soluble organic solvent, a surfactant and water,
the treatment liquid comprises a coagulant, an organic solvent, a binder resin, and water,
the coagulant comprises calcium nitrate in an amount of 24.3 to 34.7% by mass relative to the total mass of the treatment liquid, and the amount of calcium nitrate is calculated in terms of anhydrous calcium nitrate,
an amount of organic solvent having a boiling point at one atmosphere of 240° C. or higher in the treatment liquid is not more than 8% by mass,
the binder resin contains at least one resin selected from the group consisting of polyvinyl alcohols having a degree of saponification of at least 95%, (meth)acrylic resins having an acid value of not more than 100, and styrene-(meth)acrylic resins having an acid value of not more than 100, and
a pH of the treatment liquid is within a range from 3.5 to 10.5, and a viscosity of the treatment liquid at 25° C. is within a range from 5.5 to 18.5 mPa s.

2. The ink set according to claim 1, which is used for recording to a recording medium that exhibits an amount of absorption of pure water in a contact time of 100 msec, measured using a dynamic scanning absorption meter, of 5 to 15 g/m$^2$.

3. The ink set according to claim 1, wherein the treatment liquid also comprises a basic pH adjuster.

4. The ink set according to Clam 1, wherein
the inkjet ink also comprises a resin, and
an amount of the resin, relative to a solid fraction of the inkjet ink, is within a range from 30% by mass to 90% by mass.

5. The ink set according to claim 4, wherein an acid value of the resin is within a range from 10 to 65 mgKOH/g.

6. The ink set according to claim 1, wherein the inkjet ink also comprises a wax.

7. The ink set according to claim 1, wherein an amount of organic solvent having a boiling point at one atmosphere of 240° C. or higher in the inkjet ink is not more than 8% by mass.

8. A method for producing printed matter using the ink set according to claim 1, the method comprising:
applying the treatment liquid to a recording medium, and
applying the inkjet ink in a state where a drying rate of the treatment liquid on the recording medium is not more than 10% in terms of mass.

9. Printed matter obtained by printing the ink set according to claim 1 onto a recording medium.

10. The ink set according to claim 1, wherein the treatment liquid further comprises a nonionic water-soluble resin.

* * * * *